United States Patent
Newham et al.

(10) Patent No.: US 9,235,241 B2
(45) Date of Patent: Jan. 12, 2016

(54) ANATOMICAL GESTURES DETECTION SYSTEM USING RADIO SIGNALS

(75) Inventors: Adam E. Newham, Poway, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 13/561,070

(22) Filed: Jul. 29, 2012

(65) Prior Publication Data
US 2014/0028539 A1    Jan. 30, 2014

(51) Int. Cl.
*G09G 5/00* (2006.01)
*G06F 1/16* (2006.01)
*G06F 3/01* (2006.01)
*H04M 1/60* (2006.01)

(52) U.S. Cl.
CPC ............ *G06F 1/1694* (2013.01); *G06F 1/1698* (2013.01); *G06F 3/014* (2013.01); *G06F 3/017* (2013.01); *H04M 1/6066* (2013.01)

(58) Field of Classification Search
USPC ........................................................ 345/156
See application file for complete search history.

(56) References Cited

U.S. PATENT DOCUMENTS

| | | | |
|---|---|---|---|
| 5,009,501 A | 4/1991 | Fenner et al. | |
| 5,616,078 A | 4/1997 | Oh | |
| 5,963,891 A | 10/1999 | Walker et al. | |
| 5,971,091 A | 10/1999 | Kamen et al. | |
| 6,050,357 A | 4/2000 | Staelin et al. | |
| 6,539,336 B1 | 3/2003 | Vock et al. | |
| 6,543,564 B1 | 4/2003 | Kamen et al. | |
| 6,543,769 B1 | 4/2003 | Podoloff et al. | |
| 6,581,714 B1 | 6/2003 | Kamen et al. | |
| 6,784,826 B2 | 8/2004 | Kane et al. | |
| 7,000,469 B2 | 2/2006 | Foxlin et al. | |
| 7,004,271 B1 | 2/2006 | Kamen et al. | |

(Continued)

FOREIGN PATENT DOCUMENTS

| | | |
|---|---|---|
| CN | 1919388 A | 2/2007 |
| GB | 2428591 A | 2/2007 |

(Continued)

OTHER PUBLICATIONS

Anlauff et al. "A Method for Outdoor Skateboarding Video Games". Proceedings of the 7th International Conference on Advances in Computer Entertainment Technology [Online], pp. 40-44 (2010).

(Continued)

*Primary Examiner* — Fred Tzeng

(57) ABSTRACT

A system for detecting anatomical gestures based on the interpretation of radio signal transmissions. A user may place wireless devices on his/her head and wrist(s) that communicate through short-range radio signals. The wireless devices may collect information regarding signal exchanges which may be analyzed by a computing device to determine positional information about the user's hands. The computing device may compile the positional information into sequences and evaluate the sequences against predefined patterns of movement data. The computing device may interpret recognized movements as computer input commands. In an embodiment, multiple wireless devices may be placed on the user's wrists to enable multi-touch input commands. In an embodiment, data from motion sensors, such as accelerometers and gyroscopes, may be combined with movement data based on radio signal information.

41 Claims, 20 Drawing Sheets

(56) References Cited

U.S. PATENT DOCUMENTS

| | | | |
|---|---|---|---|
| 7,173,604 B2 | 2/2007 | Marvit et al. | |
| 7,264,554 B2 | 9/2007 | Bentley | |
| 7,365,647 B2 | 4/2008 | Nativ | |
| 7,420,472 B2 | 9/2008 | Tran | |
| 7,602,301 B1 | 10/2009 | Stirling et al. | |
| 7,628,074 B2* | 12/2009 | Vannucci et al. | 73/597 |
| 7,640,106 B1 | 12/2009 | Stokar et al. | |
| 7,733,224 B2 | 6/2010 | Tran | |
| 7,777,626 B2 | 8/2010 | Brommer et al. | |
| 7,782,755 B2 | 8/2010 | Yu | |
| 7,821,407 B2 | 10/2010 | ***Shears et al. | |
| 7,831,932 B2 | 11/2010 | Josephsoon et al. | |
| 7,877,224 B2 | 1/2011 | Ohta | |
| 7,931,604 B2* | 4/2011 | Zohar et al. | 600/595 |
| 7,952,483 B2 | 5/2011 | Ferguson et al. | |
| 7,995,644 B2 | 8/2011 | Sahinoglu et al. | |
| 7,996,496 B2 | 8/2011 | Haartsen et al. | |
| 7,996,571 B2 | 8/2011 | Salokannel | |
| 8,005,257 B2 | 8/2011 | Venetsky et al. | |
| 8,126,735 B2 | 2/2012 | Dicks et al. | |
| 8,184,038 B2 | 5/2012 | Ekbal et al. | |
| 8,193,929 B1 | 6/2012 | Siu et al. | |
| 8,200,321 B2 | 6/2012 | McCombie et al. | |
| 8,368,975 B2 | 2/2013 | Baba | |
| 8,379,134 B2 | 2/2013 | Foster | |
| 8,461,988 B2 | 6/2013 | Tran | |
| 8,475,370 B2 | 7/2013 | McCombie et al. | |
| 8,489,021 B2 | 7/2013 | Granqvist et al. | |
| 8,525,673 B2 | 9/2013 | Tran | |
| 8,527,038 B2 | 9/2013 | Moon et al. | |
| 8,548,581 B2 | 10/2013 | Chan et al. | |
| 8,777,742 B2 | 7/2014 | Sato | |
| 2003/0155167 A1 | 8/2003 | Kamen et al. | |
| 2004/0201857 A1 | 10/2004 | Foxlin | |
| 2005/0121866 A1 | 6/2005 | Kamen et al. | |
| 2007/0249288 A1 | 10/2007 | Moallemi et al. | |
| 2007/0250286 A1 | 10/2007 | Duncan et al. | |
| 2007/0259690 A1 | 11/2007 | Julian et al. | |
| 2007/0285306 A1 | 12/2007 | Julian et al. | |
| 2008/0136775 A1 | 6/2008 | Conant | |
| 2008/0191864 A1 | 8/2008 | Wolfson | |
| 2008/0214305 A1 | 9/2008 | Addington et al. | |
| 2008/0221487 A1* | 9/2008 | Zohar et al. | 600/595 |
| 2008/0234023 A1 | 9/2008 | Mullahkhel et al. | |
| 2008/0262772 A1 | 10/2008 | Luinge et al. | |
| 2009/0017782 A1 | 1/2009 | Monat et al. | |
| 2009/0203441 A1 | 8/2009 | Piccoli et al. | |
| 2009/0234614 A1 | 9/2009 | Kahn et al. | |
| 2010/0009752 A1 | 1/2010 | Rubin et al. | |
| 2010/0090949 A1 | 4/2010 | Tianqiao et al. | |
| 2010/0184563 A1 | 7/2010 | Molyneux et al. | |
| 2010/0201573 A1 | 8/2010 | Lamming | |
| 2010/0240345 A1 | 9/2010 | Karrman et al. | |
| 2010/0308999 A1 | 12/2010 | Chornenky | |
| 2011/0059769 A1 | 3/2011 | Brunolli | |
| 2011/0124387 A1 | 5/2011 | Sauerbrei et al. | |
| 2011/0187640 A1 | 8/2011 | Jacobsen et al. | |
| 2011/0199292 A1 | 8/2011 | Kilbride | |
| 2011/0208444 A1 | 8/2011 | Solinsky | |
| 2011/0257909 A1 | 10/2011 | Allen et al. | |
| 2011/0292819 A1 | 12/2011 | Ekbal et al. | |
| 2011/0292820 A1 | 12/2011 | Ekbal et al. | |
| 2011/0294449 A1 | 12/2011 | Budianu et al. | |
| 2011/0294450 A1 | 12/2011 | Budianu et al. | |
| 2011/0302536 A1 | 12/2011 | Yeap | |
| 2011/0316747 A1 | 12/2011 | Budianu et al. | |
| 2012/0044062 A1 | 2/2012 | Jersa et al. | |
| 2012/0212374 A1 | 8/2012 | Kirby et al. | |
| 2012/0220233 A1 | 8/2012 | Teague et al. | |
| 2012/0249544 A1* | 10/2012 | Maciocci et al. | 345/419 |
| 2012/0249590 A1* | 10/2012 | Maciocci et al. | 345/633 |
| 2012/0283016 A1 | 11/2012 | Persaud et al. | |
| 2013/0173070 A1* | 7/2013 | Tennyson et al. | 700/284 |

FOREIGN PATENT DOCUMENTS

| | | |
|---|---|---|
| JP | 2006279649 A | 10/2006 |
| JP | 2007029236 A | 2/2007 |
| JP | 2007038001 A | 2/2007 |
| JP | 2009020656 A | 1/2009 |
| JP | 2009517047 A | 4/2009 |
| JP | 2010509000 A | 3/2010 |
| JP | 2010082340 A | 4/2010 |
| JP | 2010267199 A | 11/2010 |
| WO | 2006103676 A2 | 10/2006 |
| WO | WO-2007062102 A1 | 5/2007 |
| WO | 2010068901 A2 | 6/2010 |
| WO | 2012024434 A1 | 2/2012 |
| WO | 2012094143 A1 | 7/2012 |

OTHER PUBLICATIONS

Di Renzo et al. "Pulse Shape Distortion and Ranging Accuracy in UWB-based Body Area Networks for Full-Body Motion Capture and Gait Analysis," IEEE Global Telecommunications Conference [Online] 2007, pp. 3775-3780.

"e4ride electric skateboard—user manual" http://greenskate.co.nz/assets/electricskateboardmanual.pdf (accessed Jul. 7, 2011). 4 pgs. (See p. 1.).

Hoffman et al. "Breaking the Status Quo: Improving 3D Gesture Recognition with Spatially Convenient Input Devices," IEEE Virtual Reality Conference, Mar. 2010, pp. 59-66.

Hol et al. "Tightly coupled UWB/IMU Pose Estimation," IEEE Int'l Conference on Ultra-Wideband, Sep. 2009, pp. 688-692.

MVN MoCap Product, Xsens Technologies, B. V. [online], retrieved on Jun. 6, 2012.

Young et al. "Distributed Estimation Of Linear Acceleration For Improved Accuracy In Wireless Inertial Motion Capture", Proceedings of the 9th International Conference on Information Processing in Sensor Networks, pp. 256-267, Apr. 2010.

Zemene W Mekonnen et al "Constrained maximum likelihood positioning for UWB based human motion tracking", Indoor Positioning and Indoor Navigation (I PIN), 2010 International Conference on, IEEE, Piscataway, NJ, USA, Sep. 15, 2010, pp. 1-10, XP031810232, ISBN: 978-1-4244-5862-2-2.

Co-pending U.S. Appl. No. 13/078,400, filed Apr. 1, 2011.
Co-pending U.S. Appl. No. 13/276,742, filed Oct. 19, 2011.
Co-pending U.S. Appl. No. 13/406,355, filed Feb. 27, 2012.
International Search Report and Written Opinion—PCT/US2013/052372—ISA/EPO—Oct. 2, 2013.

* cited by examiner

ANATOMICAL GESTURES DETECTION SYSTEM USING RADIO SIGNALS

BACKGROUND

User interactions with computers are often tedious and non-intuitive. Typically users must use a keyboard and mouse to manipulate applications, such as presentations, requiring direct interactions with the computer, which can result in belabored computer control and suboptimal interactions with an audience. Gesture-based control of computer software does exist, somewhat freeing the user of direct computer interaction. Camera systems can capture and process images to control software, but require extensive environmental constraints and setup to ensure proper data capture. Other systems use sensor packs, such as accelerometers, to sense movements of a user, but use only relative movements that can result in crude control which lacks software command versatility.

SUMMARY

The various embodiments provide a system for detecting a user's real-time hand gestures and executing computer input commands based on the gestures. The system may employ a wireless sensor device and wireless ranging devices that are placed on the user's body that exchange short-range radio transmissions as the user moves his/her hands. The wireless ranging devices may discern information regarding the relative location of the wireless sensor devices through radio signal ranging techniques and angle of arrival calculations. A system may employ a computing device (or computing hub) to track determined hand positions as movement sequences or patterns of relative positions over time, and compare the movements or patterns to predefined patterns. The system may recognize a gesture when a measured movement sequence has similarities to a predefined pattern, and may initiate the execution of an associated computer input command. As the system utilizes radio signals to measure distances between the wireless sensor device and the wireless ranging devices that users may wear, users may avoid extensive setup procedures that are typically required for conventional gesture-based control systems. Users may also seamlessly interact with computers without common environmental and situational restrictions of conventional gesture-based control systems, such as lighting or maintaining a clear line of sight between the user and a camera.

In a particular embodiment, a method for detecting user hand movements and interpreting such movements as a computer input, may include positioning a wireless sensor device near a user's hand, positioning a first and a second wireless ranging device on the user's body a fixed distance apart such that the two wireless ranging devices form an axis relative to a portion of the user's body, determining a distance between the wireless sensor device and each wireless ranging device through wireless signal ranging techniques, calculating an angle between the wireless sensor device and the wireless ranging devices based on the determined distances, determining an estimated position of the wireless sensor device relative to the wireless ranging devices based on the determined distances and calculated angle, collecting a sequence of determined estimated positions of the wireless sensor device over a period of time, comparing the collected sequence of determined estimated positions of the wireless sensor device over a period of time to a database of gesture movement patterns to determine if there is a match within a predefined tolerance, correlating a computer input command to a recognized gesture, and executing the correlated computer input command in a computing device.

In an embodiment, the method may further include receiving motion sensor data from the wireless sensor device, and using the received motion sensor data when comparing the collected sequence of determined estimated positions of the wireless sensor device over a period of time to a database of gesture movement patterns to determine if there is a match within a predefined tolerance. In an embodiment, determining a distance between the wireless sensor device and each wireless ranging device through wireless signal ranging techniques may include measuring the distances using wireless ranging transmissions between Peanut® transceivers. In an embodiment, the method may include conducting calibration operations that record determined distances and one or more calculated angles in memory while the user performs prescribed physical movements.

In an embodiment, the method may include determining directional information from one or more of a magnetometer, an accelerometer and a gyroscope contained within at least one of the wireless ranging devices, and using the determined directional information when comparing the collected sequence of determined estimated positions of the wireless sensor device over a period of time to a database of gesture movement patterns to determine if there is a match within a predefined tolerance. In an embodiment, calculating an angle between the wireless sensor device and the wireless ranging devices based on the determined distances, determining an estimated position of the wireless sensor device relative to the wireless ranging devices based on the determined distances and calculated angle, collecting a sequence of determined estimated positions of the wireless sensor device over a period of time, comparing the collected sequence of determined estimated positions of the wireless sensor device over a period of time to a database of gesture movement patterns to determine if there is a match within a predefined tolerance, and correlating a computer input command to a recognized gesture may be accomplished in a computing device selected from one of the wireless sensor device, either wireless ranging device, a wireless mobile device carried by the user, and a separate computing device.

In an embodiment, the method may include positioning a second wireless sensor device near the user's other hand, in which collecting a sequence of determined estimated positions of the wireless sensor device over a period of time comprises collecting a sequence of determined estimated positions of both wireless sensor devices over a period of time, and comparing the collected sequence of determined estimated positions of the wireless sensor device over a period of time to a database of gesture movement patterns to determine if there is a match within a predefined tolerance comprises comparing the collected sequence of determined estimated positions of both wireless sensor devices over a period of time to the database of gesture movement patterns to determine if there is a match within a predefined tolerance.

In an embodiment, the method may include positioning a third wireless ranging device on the user such that it is displaced from the axis between the first and second wireless ranging devices, and determining a distance between the wireless sensor device and the third wireless ranging device through wireless signal ranging techniques, in which comparing the collected sequence of determined estimated positions of the wireless sensor device over a period of time to a database of gesture movement patterns to determine if there is a match within a predefined tolerance comprises comparing the collected sequence of determined estimated positions of the wireless sensor device and the determined distance between the wireless sensor device and the third wireless ranging device over a period of time to the database of gesture movement patterns to determine if there is a match within a predefined tolerance. In an embodiment, the wireless ranging devices may be located on one of a headset, a pair of glasses, a helmet, a hard hat, a belt, and a pair of earpiece devices. In an embodiment, the method may include estimating bounding areas of the user's anatomical range of motion, and calculating skeletal orientations using inverse kinematic analysis based on the estimated bounding areas, the received motion sensor data, and the determined estimated position of the wireless sensor device.

The methods described above may be implemented in a computing device having a processor configured to perform operations of the methods. Operations of the methods described above may be implemented in processor-executable software instructions stored on a non-transitory processor-readable storage medium. The methods described above may be implemented in a system including a computing device, one or more wireless sensor devices, and two or more wireless ranging devices, in which the system devices are configured to implement the method operations.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
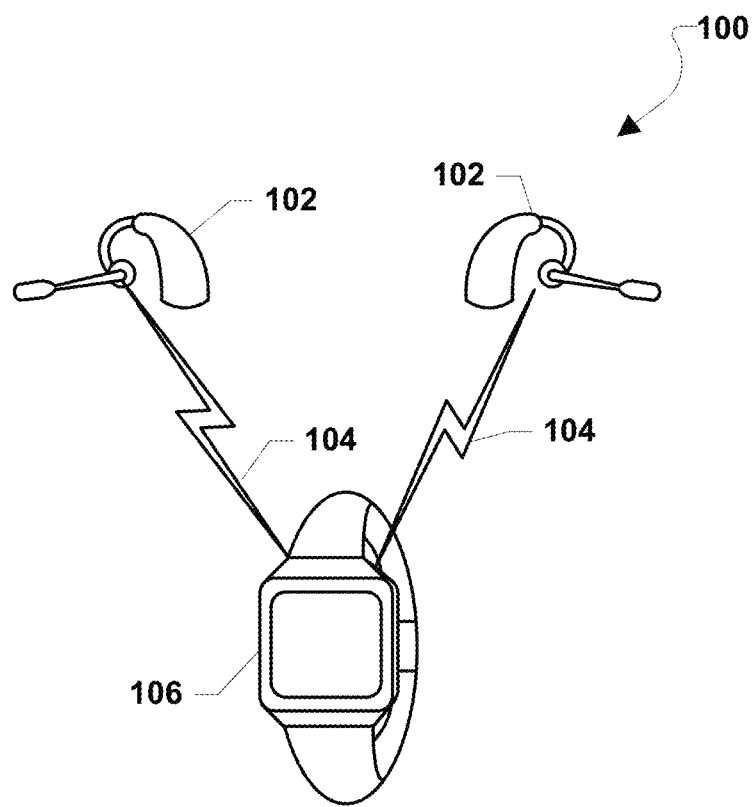
FIGS. 1A-1C are system block diagrams of alternative communication systems suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "computing device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, and similar personal electronic devices which include a programmable processor, memory and circuitry at least capable of sending and/or receiving wireless and/or wired data transmissions, accessing local or remote database structures, and performing various calculations.

The term "wireless sensor device" is used herein to refer to a device that may be worn or carried by a user, equipped with at least one sensor, and configured to interact with a wireless communication system. In an embodiment, a wireless sensor device may be configured to be worn by a user around the user's wrist in a manner similar to that of a bracelet or watch. In alternative embodiments, a wireless sensor device may be in the form of a badge, tag, sticker, or patch, to name but a few examples.

The term "wireless ranging device" is used herein to refer to a device that may be affixed to a user and configured to interact with a wireless communication system to determine ranging information of wireless sensor devices. In describing the various embodiments, head-mounted wireless ranging devices (e.g., earpieces) are used as an example of wireless ranging devices, but any of a variety of devices and configurations may be used. The system takes advantage of at least two devices mounted on the user in a manner that provides an axis with a fixed separation distance (e.g., the width of the user's head) that may be used in calculating an angular orientation of wireless sensor devices (e.g., a wireless hub device worn on the wrist) with respect to the user. Earpiece devices (e.g., Bluetooth® transceivers worn in or on the ears) provide a convenient example of such a deployment. However, the two or more wireless ranging devices (e.g., Peanut® transceivers) may be worn in numerous other configurations and/or forms that provide a fixed separation distance and a coordinate axis tied to a user's body, such as transceivers on the sides of a helmet, a hard hat, a headset, a belt, or a pair of glasses worn by the user. As another example, the two or more wireless transceivers (e.g., Peanut® transceivers) may be positioned on the shoulder epaulets of a jacket worn by the user or on opposite sides of a user's belt. Unless specifically recited in the claims, the claims are not limited to head-mounted devices and references within this application to ear- and head-mounted wireless ranging devices worn by the user are intended merely as examples. In another embodiment, more than two Peanut® transceiver devices may be worn by the user to provide a reference plane with respect to the user that may be use in determining three-axis angular and triangulation calculations. For example, a user may wear two earpiece wireless ranging devices and a third wireless ranging device affixed to the back of his/her head or helmet. In another example, the user may wear an accessory that has multiple wireless ranging devices (e.g., Peanut® transceivers) attached to it such that when the accessory is worn, multiple distance measurements and multiple angular determinations may be made of wireless sensor devices on the user's wrist in order to more accurately estimate the location of the user's hand(s).

The various embodiments provide a system for solving the limitations of direct computer interaction and currently available gesture-based solutions by using wireless signal transmissions to detect user movements, recognizing movement patterns and implementing correlated computer input commands on a computing device. The embodiments may include multiple wrist-mounted wireless sensor devices and head-mounted wireless ranging devices worn by a user. The wireless sensor devices and wireless ranging devices may contain transceivers configured to exchange short-range radio transmissions. In an embodiment, the short-range radio transceivers may be Peanut® proprietary devices that have data and ranging capabilities and may constitute a body area network (or personal area network). In another embodiment, the wireless sensor devices and wireless ranging devices may contain additional transceiver units, such as Bluetooth® or Zigbee® radios. The short-range radio transmissions may be initiated by one device (e.g., a head-mounted ranging device), received by a separate device (e.g., the wrist-mounted wireless sensor device), and return a reply signal to the original device. Through such exchanges, the wireless ranging devices may determine the range (or distance to) and angle of the wireless sensor devices compared to the ranging devices and the user's head. Based on the range and calculated angle, a processor within the system may calculate the relative positions of the wireless sensor devices for a given time.

The system may include a computing hub device, such as a smartphone equipped with a transceiver, which may exchange transmissions with the wireless ranging devices and determine the relative position of the wireless sensor devices. In another embodiment, any actions executed by the computing hub (e.g., database accesses, calculations, or software implementations, etc.) may be alternatively performed by any other computing device within the system, such as a nearby laptop computer, a remote server, the wireless ranging devices, or the wireless sensor devices.

The various embodiments may record patterns of relative positions of the wireless sensor devices over time. In an embodiment, data from sensor units, such as one or more accelerometers and gyroscopes, located within the wireless sensor devices may also be recorded. The computing hub may compare sequences of wireless sensor device relative positions against predefined or stored patterns that represent particular gestures. In an embodiment, gesture movement patterns may be defined through user training and calibration routines. For example, the system may prompt the user to perform a series of prescribed motions and/or poses that the computing hub (or another computing device) may record and store to analyze future motions. If the computing hub determines that a recorded sequence of positions or movements of the wireless sensor devices matches or nearly matches a gesture movement pattern, the computing hub may recognize that a gesture has been performed, and take an action in response.

In the various embodiments, the computing hub may correlate recognized gestures to input commands for software running on computing devices (e.g., a remote computing device). The computing hub may query a database using a recognized gesture (e.g., a unique identifier representing the recognized gesture) and retrieve an associated software input command. For example, the computing hub may determine that a recognized swipe gesture corresponds to a software command that causes the deletion of document text within a word processing program running on a remote server. The computing hub may transmit the input command to the appropriate associated computing device for execution.

In an embodiment, gestures may be the combination of movement data from wireless sensor devices in the context of another wireless sensor device's movement patterns. Combining movement data from multiple wireless sensor devices, the computing hub may recognize more complex gestures similar to multi-touch actions (e.g., user physical actions on a touch-sensitive screen or display). For example, the computing hub may recognize a pinch gesture when two wireless sensor devices, worn on opposite wrists by a user, move towards each other in a lateral movement over a certain period of time. Gestures based on multiple wireless sensor devices may enable more complex input commands. For example, the computing hub may recognize a gesture when the user moves his/her wrists apart horizontally and transmit a 'zoom' input command to a remote server, causing the server to resize a document by an amount determined based on the user movement.

In an embodiment, additional measurements (e.g., the direction of the user's head with respect to magnetic north or to the gravity vector) may be collected by the wireless ranging devices and/or a separate computing device to determine the position of the wireless sensor devices relative to the user's body (e.g., head) or other reference points. The ranging devices may contain sensor units, such as one or more accelerometers, gyroscopes, and gravitometers, that can measure accelerations, movements, and inclination of the user's head. For example, the system may determine the user is looking down or up based on gravity vector measurements by one or more of accelerometers, gyroscopes and/or gravitometers within the ranging devices. The system may use determined movements of the user's head (or other areas of his/her body) to add spatial context to discerned wireless sensor device movements. For example, similar hand gestures may correspond to different input commands based on the orientation and/or movement of the ranging devices on the user's head.

In an embodiment, the system may include additional wireless devices having Peanut® transceivers that may provide additional distance measurements that may be used to determine spatial context for positional and/or movement information of the wireless sensor devices. The system may combine concurrent ranging transmissions between ranging devices, wireless sensor devices, and additional Peanut® transceivers to estimate the wireless sensor device positions. For example, the user may place a Peanut® transceiver near his/her foot (e.g., in his/her shoe) which may conduct ranging transmissions with a wireless sensor device to determine the approximate distance the wireless sensor device is from the ground. Such additional measurements may be used in recognizing movement gestures.

The various embodiments enable gesture control of computing devices without requiring redundant equipment setup routines or particular operating environments. As the system employs user-worn wireless devices (i.e., wireless sensors and ranging devices), gesture detection may be calibrated or trained to accommodate an individual user and may be used in numerous situations. For example, instead of arriving early and configuring a camera system to acknowledge his/her movements, a user employing an embodiment system may simply walk into a conference room and wave his/her hands to properly advance a presentation slide. In an embodiment, the system may support gesture detection of numerous users without additional calibration operations.

FIG. 1A illustrates a system 100 suitable for use with the various embodiments. In an embodiment, two wireless ranging devices 102 may be positioned on each side of the user's head. The ranging devices may each contain a short-range wireless transceiver, such as a Peanut® device. These ranging devices may be positioned on the user's ears, thereby positioning the devices a fixed distance apart (i.e., the width of the user's head) and forming an axis of the user's head that may serve as a coordinate reference frame. A wrist-mounted wireless sensor device 106 may contain at least one wireless transceiver, such as a Peanut® device, capable of exchanging short-range radio signals 104 with the two ranging devices 102. In another embodiment, the wireless sensor device 106 may contain numerous other devices, such as sensor units (e.g., a temperature sensor, a perspiration sensor, accelerometers, gyroscopes, a magnetometer, a microphone, etc.). The wireless sensor device 106 may exchange transmissions with the ranging devices 102 that contain various types of information, such as time-stamped data packets, audible media data, or other electronic files.

In an embodiment, the ranging devices 102 and the wrist-mounted wireless sensor device 106 may be linked through a pairing procedure that provides exclusivity in transmissions. For example, the wrist-mounted wireless sensor device 106 may send encrypted transmissions that many devices within the radio signal range may receive so that only the ranging devices 102 can decipher and utilize the data. In another embodiment, the pairing between the wireless sensor device and the wireless ranging devices may be accomplished at a manufacturing facility or, alternatively, initialized by the user.

Figure 1B:
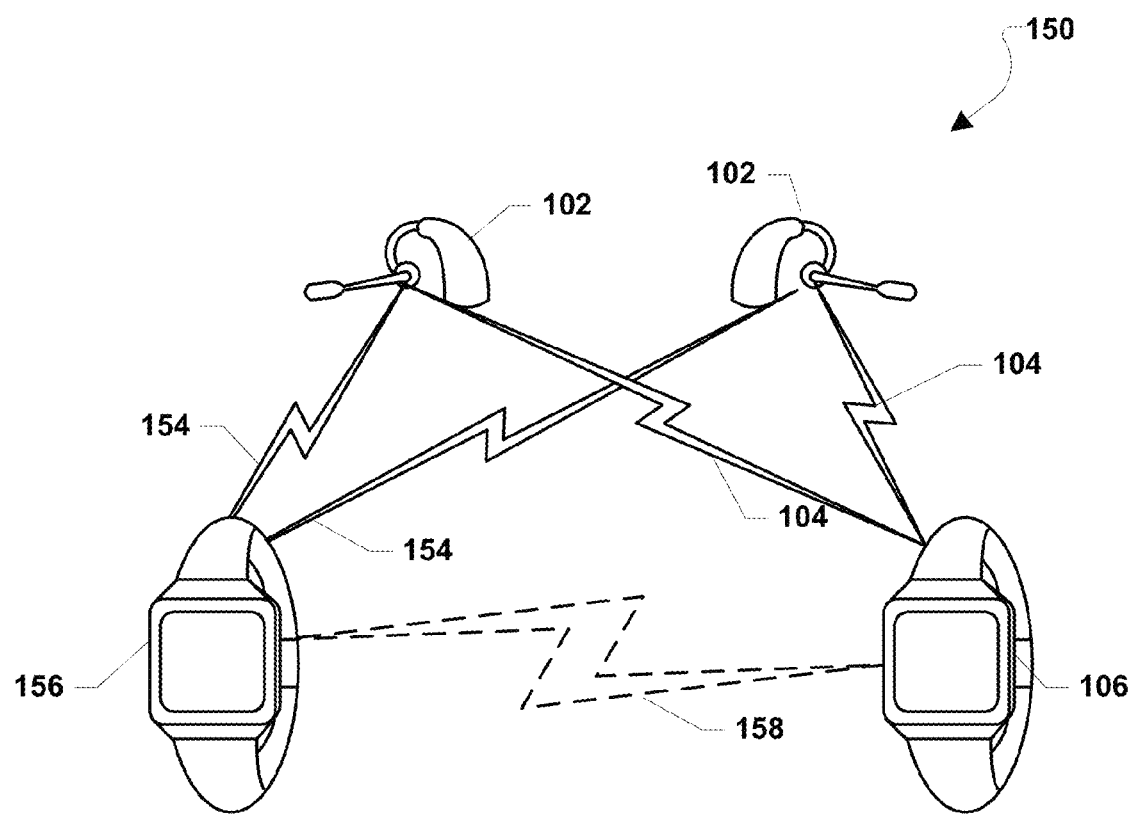

FIG. 1B illustrates another system 150 suitable for use with the various embodiments that includes a second wrist-mounted wireless sensor device 156. The two wrist-mounted wireless sensor devices 106, 156 may be placed on opposite wrists to enable tracking of movement of both of the user's hands. The second wrist-mounted wireless sensor device 156 may contain at least one wireless transceiver, such as a Peanut® device, capable of exchanging short-range radio signals 154 with the two head-mounted wireless ranging devices 102 and may be placed on the opposite arm from that of the first wireless sensor device 106.

The ranging devices 102 may simultaneously exchange transmissions with both the wireless sensor devices 106, 156. In an embodiment, the wireless sensor devices 106, 156 may contain multiple short-range radio transceivers, such as Peanut®, Bluetooth® or Zigbee®. In an optional embodiment, the wireless sensor devices 106, 156 may communicate with each other via transmissions 158 exchanged through transceivers. In an embodiment, the wireless sensor devices 106, 156 and the ranging devices 102 may all have encrypted wireless connections (e.g., Bluetooth® pairing) that allow exclusive communication between the devices.

Figure 1C:
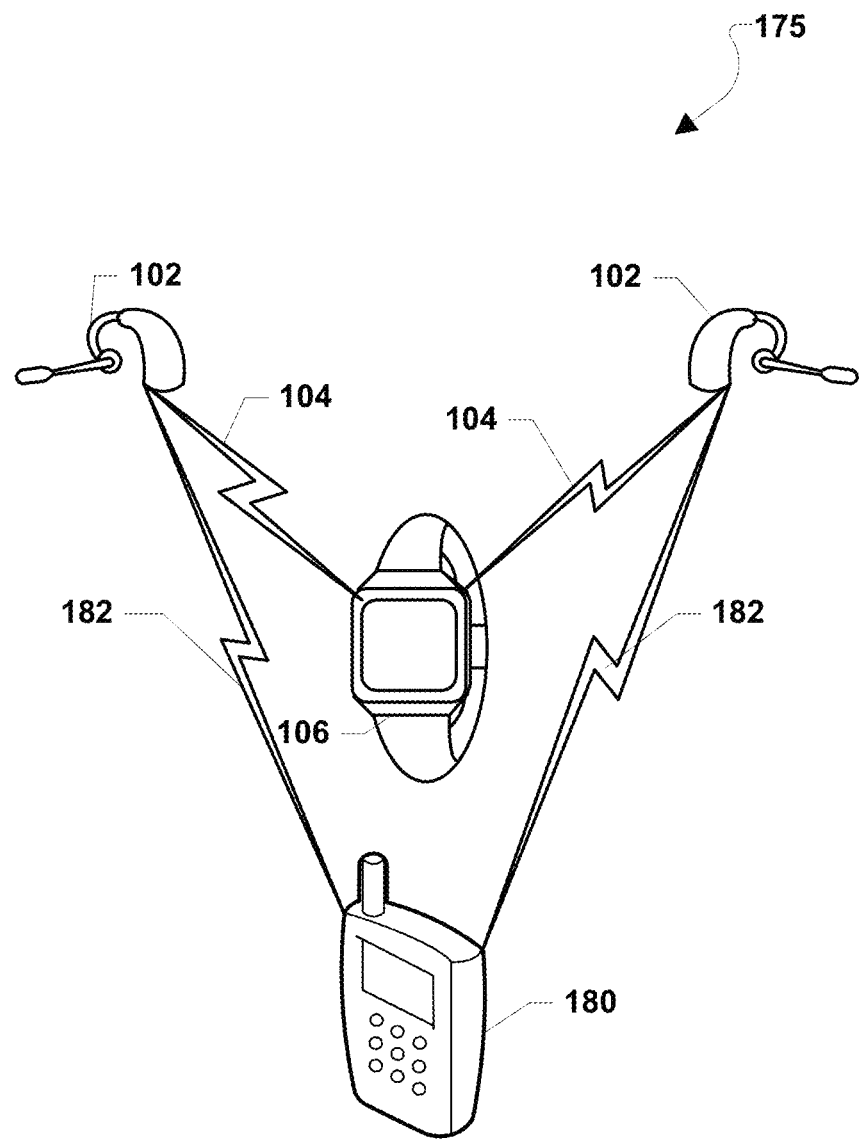

FIG. 1C illustrates another system 175 suitable for use with the various embodiments. In addition to the head-mounted wireless ranging devices 102, wrist-mounted wireless sensor device 106, and short-range radio signals 104 described above with reference to FIG. 1A or FIG. 1B, the system 175 may include a computing hub 180. In an embodiment, the computing hub 180 may be a wireless mobile device (i.e., a smartphone). The computing hub 180 may also include short-range radio transceivers capable of exchanging short-range radio signals 182 with the ranging devices 102. In an embodiment, such radio signals 182 may be Peanut®, Bluetooth® or Zigbee® radio transmissions. The computing hub 180 may contain a processor capable of receiving, storing, and processing information transmitted through radio signals 182 exchanged with the ranging devices 102. The computing hub 180 may also contain volatile and nonvolatile storage in which the computing hub 180 may access and/or store data collected from the ranging devices 102. In another embodiment, the computing hub 180 may be a nearby laptop or server. In another embodiment, the computing hub 180 may be a device contained within the wireless sensor device 106 or ranging devices 102. In another embodiment, the wireless sensor device 106 may also communicate directly with the computing hub 180 via short-range radio transmissions (e.g., Peanut®, Bluetooth®, or Zigbee® signals). In another embodiment, the system 175 may include a second wrist-mounted wireless sensor device that exchanges radio transmissions with both the ranging devices and the computing hub 180.

Figure 2:
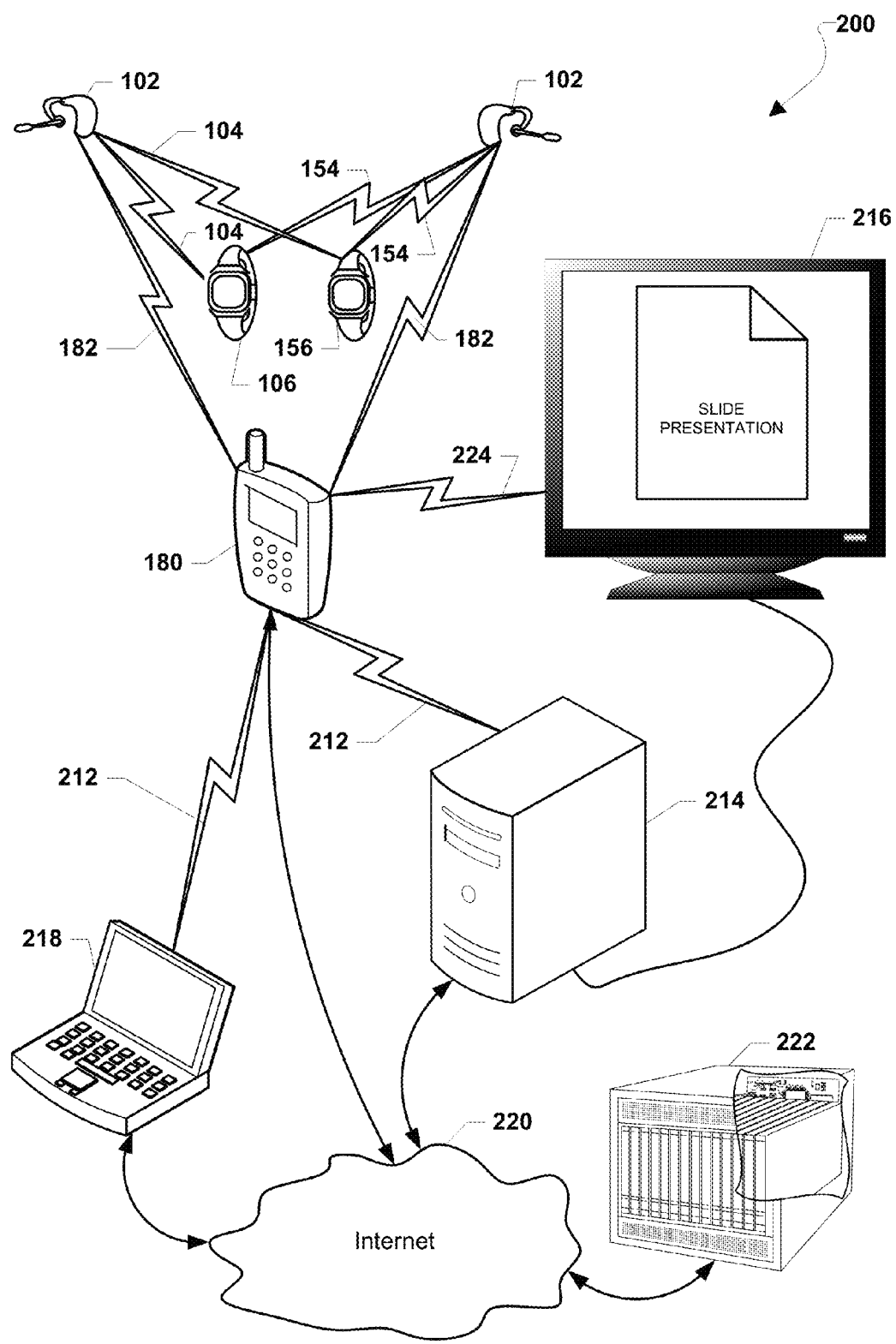
FIG. 2 is a communication system block diagram of a network suitable for use with the various embodiments

In an embodiment, the system may include a second wrist-mounted wireless sensor device that exchanges radio transmissions with both the ranging devices. An example of such a system 200 is illustrated in FIG. 2. Wireless ranging devices 102 may communicate via short-range radio signals 104, 154 such as through Peanut® device signals, with a first wireless sensor device 106 worn on one of the user's wrists, and with a second wireless sensor device 156 mounted on the user's opposite wrist. The ranging devices 102 may also communicate via short-range radio signal 182 with a computing hub 180 (e.g., a wireless mobile device, smartphone, etc.). The short-range radio signals 182 may be Peanut®, Bluetooth® or Zigbee® radio transmissions.

In an embodiment, the computing hub 180 may include a cellular network wireless modem chip that allows communication via a cellular network. Through the cellular network connection, the computing hub 180 may access the Internet 220. In an embodiment, the computing hub 180 may exchange data with a remote server 222 (e.g., a cloud computing server) that may maintain a database of information relevant to the wireless sensor devices 106, 156. For example, the remote server 222 may maintain a database of previously recognized gestures applicable to the equipment described above with reference to FIG. 1A-1C.

The computing hub 180 may exchange short-range transmissions 212 (e.g., WiFi, Bluetooth®, etc.) with other devices equipped with short-range radio transceivers, such as a laptop computer 218 or a desktop computer 214. In an embodiment, the computing hub 180 may transmit computations and/or other information made by the ranging devices 102, the wireless sensor devices 106, 156 or the computing hub 180 to external devices, such as a laptop computer 218 or desktop computer 214. In an embodiment, the laptop computer 218 may communicate with remote devices, such as a remote server 222 (e.g., cloud computers) via Internet protocols, and may relay information from the computing hub 180 to the remote equipment. An external device, such as a desktop computer 214, may be connected to and control a display unit 216 (e.g., a monitor, projector, screen, laptop display, television, etc.), which may present graphical displays generated by software running on the desktop computer 214. For example, the desktop computer 214 may execute slide presentation software and generate slide images for display on the display unit 216. In an embodiment, the computing hub 180 may transmit data to the remote device (e.g., desktop computer 214), which results in different representations on the display unit 216. In another embodiment, the computing hub 180 may provide the display unit 216 with graphical representations for display via wireless transmissions 224.

Figure 3A:
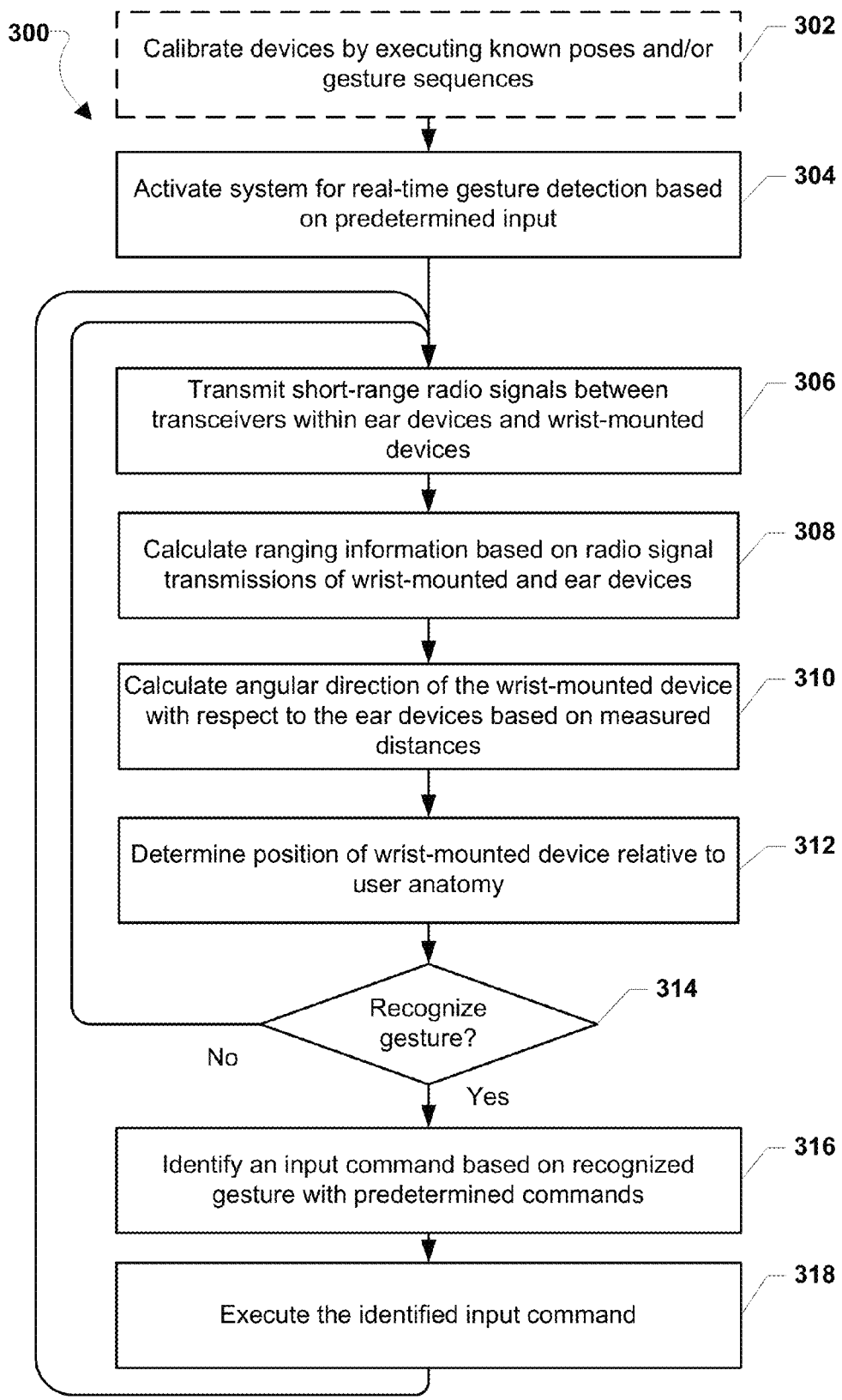
FIG. 3A is a process flow diagram illustrating an embodiment method for recognizing gestures and executing associated commands suitable for use with the various embodiments.

In an embodiment, the system 200 may employ transmission scheduling methods to minimize wireless transmission collisions amongst the wireless sensor devices 106, 156, the ranging devices 102, and the computing hub 180. If numerous devices transmit data between each other simultaneously, the resulting interference may cause incomplete or corrupted information due to radio signals arriving at the transceivers of the devices simultaneously. The system's 200 transmission scheduling methods may involve assigning to each device a particular time (e.g., a time within each minute) when each device may exclusively transmit data to the other devices FIG. 3A illustrates an embodiment method 300 for recognizing gestures made in the form of a user's movement gestures and executing corresponding commands within a computing device based on the recognized gestures. In an embodiment, the user may employ a system which includes at least one wireless sensor device, two wireless ranging devices affixed to the sides of the user's head, and a computing hub (i.e., a wireless mobile device), as described above with reference to FIG. 1C or 2. In optional block 302, a user may calibrate or train the system by performing a set of predefined or prescribed movements, while the system monitors the movements. Calibration or training operations may be a onetime or infrequently-executed routine that may define parameters (e.g., the range of movement for a user's arms) used by the system when assessing movement data. In an embodiment, the calibration or training operations may also enable the system to store movement patterns of specific gestures. In an embodiment, the calibration or training operations may define parameters specific to a particular user of the system (e.g., a particular user's arm length). Examples of calibration or training operations are described below with reference to FIG. 4.

In block 304, the user may activate the system, such as by executing a predetermined operation or movement interpreted by the system as an initiating event. The system may be activated when all of the devices of the system have power and are capable of transmitting and receiving transmissions between each other. In an embodiment, activation of the system in block 304 may require the user to directly engage an interface designated for system activation. For example, the user may activate the system by pressing a physical button on the housing of the wireless sensor device (e.g., a power button or switch) or another device. In another embodiment, the user may activate the system by touching a graphical user interface (GUI) button represented on a digital display of the wireless sensor device (e.g., an "Activate" button). In another embodiment, the user may interact with the computing hub to activate the system.

In an embodiment, the activation in block 304 may occur when the system devices emerge from a sleep mode and begin exchanging radio transmissions. In another embodiment, the system may activate when the computing hub receives a transmission from an external transceiver. For example, when the computing hub is carried by a user into a conference room having a laptop computer configured to communicate with the system, the computing hub and laptop may automatically connect (e.g., via a Bluetooth® pairing) which may activate the system. In an embodiment, activation of the system in block 304 may include the wireless sensor device, ranging devices, and the computing hub exchanging initializing signals with each other via short-range radio transmissions. For example, upon activation, the ranging devices may ping the wrist-mounted wireless sensor device indicating their readiness to communicate.

In another embodiment, activation in block 304 may occur when the system recognizes a user movement gesture or audible command. For example, when not activated, the system may recognize certain vocal commands or movements of the user corresponding to an activation command. For example, the computing hub may employ a microphone coupled to a speech recognition module (e.g., the processor configured with speech recognition software), which may interpret a vocal command (e.g., "Start!" or "Stop!") by the user as a command to activate or de-activate the system. As another example, the computing hub's microphone may receive audible hand clap sounds and the processor may interpret such sounds as activation/de-activation commands. In another embodiment, the wireless sensor devices may contain microphones used at least to detect audible activation/deactivation commands. In another embodiment, motion commands, such as quickly raising a wrist-mounted wireless sensor device, may be recognized by the system as activation/de-activation commands.

The operations in blocks 306-316 define an execution loop in which the activated system devices exchange radio transmissions, collect distance measurements as the user moves, recognize particular movement gestures, and act upon the recognized gestures. In block 306, the wrist-mounted wireless sensor device and ranging devices may communicate via continuous short-range radio exchanges. For example, a Peanut® radio in each ranging device may begin sending short transmissions to the wireless sensor device which may promptly reply.

In block 308, the ranging devices may determine the ranging information regarding the distance between the wireless sensor device and each ranging devices based upon the "roundtrip" time between a signal transmission and the reply from the wireless sensor device. In an embodiment, the ranging devices may send short-range radio signals (e.g., timer signals) to a transceiver within the wireless sensor device. A timer signal may contain information such as the identity of the sender (i.e., the ranging device), the identity of the recipient (i.e., the wireless sensor device), and an indicator of the time of transmission by the ranging device. Upon receipt of the timer signal, the recipient wireless sensor device may send a response transmission (i.e., return signal) to the sender ranging device. The return signal may include the same information as the original timer signal with an additional indicator of the time of return transmission. With the indicators that define the time of timer signal transmissions and the receipt time of the return signal by the ranging device, a processor in the ranging device may compute the roundtrip time. The ranging device processor may convert the roundtrip time into an estimate of the distance between the ranging device and the wireless sensor device. The ranging devices may transmit the determined ranging information to the computing hub which may collect the measurements for use in additional calculations. In another embodiment, the wireless sensor device may estimate the distance to each ranging device by performing the operations of blocks 306 and 308, by sending timer signals to the ranging devices, receiving return signals from the ranging devices, and calculating ranging information. An embodiment method of determining ranging information using Peanut® radio devices is described below with reference to FIG. 5B.

In block 310, using the collected ranging information determined by the operations in block 308, one of the devices in the system, such as the computing hub, may determine the angular position of the wireless sensor device relative to the axis between the ranging devices. For ease of reference, the relative direction from the ranging devices to the wireless sensor device measured with respect to the axis defined by the line between the two ranging devices is referred to herein as the "angle of arrival" of transmissions from the wireless sensor device. An embodiment method for determining the angle of arrival is described in detail below with reference to FIG. 5C.

In block 312, a processor within the system, such as within the computing hub, may determine the approximate position of the wireless sensor device relative to the user's anatomy. This determination may include combining the distance and angle of arrival information.

The computing hub may also use sensors that can provide directional information relative to an external reference frame (e.g., an electric compass that can detect magnetic north) in order to discern the location of the wireless sensor device compared to the user's body when the user turns his/her head. The system may detect movements by the user's head that are not indicative of gesture actions and adjust the processing of hand movement measurements to remove irrelevant head motion data. The operations that may be implemented in block 312 are described in detail below with reference to FIG. 6.

In determination block 314, the system may compare collected approximate positions and/or movements of the wireless sensor device to movement patterns in a database to determine whether a movement gesture is recognized. In an embodiment, the system may maintain a database of gesture movement patterns (e.g., pattern of approximate distances, angles of arrival and movements) of the wireless sensor device over time. For each database entry recording the wireless sensor device's movement patterns over time, the system may also store information about the orientation of the user, such as the direction of the user's head. For example, based on measurements from an electric compass contained within the ranging devices, the system may determine the user's head is facing in a certain direction. In another embodiment, the database may also contain other measurements relevant to the wireless sensor device, such as motion sensor data (e.g., data from a sensor suite of one or more accelerometers and gyroscopes) as described below. The database of gesture movement patterns may contain a sequence of approximate positions of the wireless sensor device with respect to the user's body over a time period (e.g., one to three seconds). In an embodiment, the system may store summary or trending information about determined approximate position sequence. For example, at a particular time, the system may collect information or record that the wireless sensor device has moved in a certain direction (e.g., from left to right) for a certain time period. In another embodiment, the system may collect vector information which may describe velocity and approximate direction of motion of the wireless sensor device at a particular time. Since the system may determine approximate values for distance and the angle of arrival with respect to the ranging devices, the system may use polar coordinates for tracking the approximate location and movement sequence of the wireless sensor device.

The system may compare the collected sequence of approximate positions or movement patterns of the wireless sensor device(s) against the patterns within the database of gesture movement patterns described below with reference to FIG. 4. In an embodiment, the system may iterate through each predefined gesture pattern in the database of gesture movement patterns, comparing each pattern to portions of the collected approximate position sequence having the same duration. For example, the system may compare a gesture pattern having a two-second duration to the most recent two seconds of collected approximate positions. In an embodiment, this comparison of the predefined patterns within the database of gesture movement patterns to the determined approximate position sequence may involve determining differences in the approximate position of the wireless sensor device for each time increment throughout the pattern duration. For example, the system may compare the collected approximate polar coordinates of the wireless sensor device in the determined approximate position sequence to the polar coordinate sequences of a predefined gesture pattern for the duration of the predefined gesture pattern. If the determined approximate positions sequence matches a predefined gesture pattern (i.e., the coordinates defined in the determined approximate position sequence matches the coordinates in the predefined gesture pattern to within a threshold amount), the system may recognize that the user's motions correspond to a particular gesture. In an embodiment, the system may utilize predefined tolerance or threshold values when comparing collected approximate position information with predefined gesture pattern information. For example, the system may determine that a determined approximate position sequence matches a predefined gesture pattern if differences between approximate locations in a time sequence are each within a tolerance band, which may be defined in the database. As another example, the system may match a sequence of collected approximate positions over a defined duration to a normalized predefined gesture pattern of a nominally different duration. The use of normalized gesture patterns enables the system to account for the normal variability in any human-performed gesture. Such normalized gesture patterns, which may be developed through a series training repetitions, may reflect the average positions versus time of gestures, plus statistical boundaries about each position.

If the system does not recognize the measured movement pattern as matching a predefined gesture (i.e., determination block 314="No"), the operational loop of the method 300 may continue with the operations in block 306.

In various embodiments, the operations of comparing the determined approximate position sequence to predefined gesture patterns may be conducted by any computing device within the system, including, for example, the wireless sensor device, either ranging device, a computing hub, a separate computing device, and/or a remote server.

If the system recognizes a gesture (i.e., determination block 314="Yes"), the system may determine an action to execute in a computing device based on the gesture in block 316. The system may use the recognized gesture to query a commands database that maintains data tables which relate recognized gestures to input commands. Alternatively, the database of gesture movement patterns may include the corresponding command in a record field. In an embodiment, the system may identify a recognized gesture with a unique identifier or code, which may be transmitted as input command to a separate computing device or server for execution. The system may transmit the input command to the separate computing device or server via short-range radio transmission (e.g., Peanut®, Bluetooth®, or Zigbee®) or long-range wireless links, such as Wi-Fi, 3G, 4G, LTE, or other wide area wireless networks.

In an embodiment, the commands database may be stored on any of the devices in the system, such as the computing device that performs the gesture comparisons. In another embodiment, the commands database may be stored in a device accessible to the system and located within a local network (e.g., a nearby laptop), or on a remote server (i.e., a cloud computing server). In an embodiment, values in the commands database (e.g., gesture name and/or ID, input command, etc.) may be default values. For example, the commands database may contain a data table relating a default set of common gestures to common functions of a popular software application. In another embodiment, values stored within the commands database may be edited by the user through interactions with the system. In another embodiment, the commands database may be adjusted during calibration and/or training operations as described below with reference to FIG. 4.

Input commands may be actions to be executed in software running on a computing device. For example, an input command may direct a desktop computer to create a new text document within a word processing application. Input commands may adjust or add content to applications running on the computing device. For example, an input command may direct the computing device to add text into a text document within a word processing application. Input commands may direct the computing device to create arbitrary symbols within a graphics-generating application. For example, recognized gestures may correlate to input commands which direct the computing device to emulate the user's handwriting. In another embodiment, input commands may involve multiple discrete commands which may be executed on different devices and/or within different applications.

In an embodiment, single recognized gestures may be related to different input commands for different software applications (i.e., the input commands associated with any recognized gesture may depend on the application currently running on the computing device). For example, the commands database may associate a recognized rightward swipe gesture with a command in one application running on a desktop computer and a recognized leftward swipe gesture with a different command in a separate application running on the desktop computer. In another embodiment, recognized gestures may correspond to different input commands for different applications running on separate devices. In an embodiment, recognized gestures performed by different users may be associated in the commands database with different commands. For example, a swipe by one user may cause a "delete" action in the controlled software and a similar swipe by another user may cause a "rename" action.

In block 318, the computing device being controlled may receive and execute the input command transmitted by the computing hub. In an embodiment, the computing device may use the received information within an already active software application. Alternatively, the computing device may initiate the execution of a software application based on the receipt of the input command. In an embodiment, the system may execute the input command within software running on any of the devices within the system. The system may continue to receive and process user movement gestures by returning to block 306.

Figure 3B:
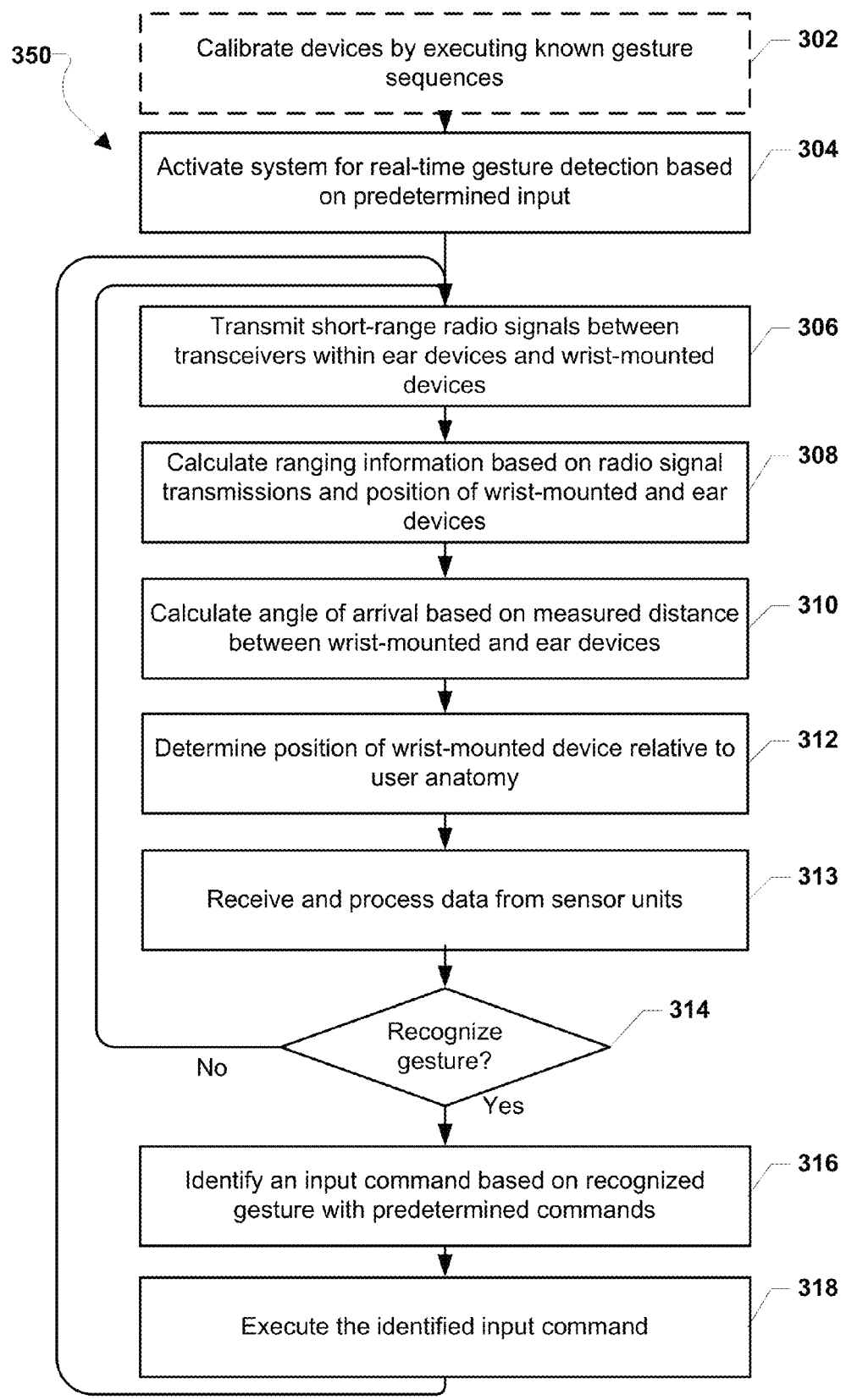
FIG. 3B is a process flow diagram illustrating another embodiment method for recognizing gestures and executing associated commands suitable for use with the various embodiments.

FIG. 3B illustrates an embodiment method 350 for recognizing gestures made via user movements and executing commands within a computing device based on the recognized gestures. The method 350 operations are similar to those of embodiment method 300 as described above with reference to FIG. 3A, with the additional operations in block 313. In an embodiment, the user may employ a wrist-mounted wireless sensor device that contains multiple motion sensor units, such as a suite of one or more accelerometers and gyroscopes, in addition to a transceiver as described below with reference to FIG. 9. The motion sensors may be a suite of accelerometers and gyroscopes configured to measure lateral and rotational accelerations about the normal six degrees of freedom (i.e., 6-axis). In block 313, the wireless sensor device may measure movements and orientations of the user's wrist and/or arm using data from the sensor units. For example, the sensors may detect radial accelerations that rotate about an axis in combination with periodic variations in the gravity acceleration, indicating rotational movement of the wireless sensor device as the user pivots his/her arm at the elbow. The sensors may also provide a constant indication of the gravity vector, enabling the system to monitor the device orientation (i.e., pitch, roll, and yaw) with respect to the center of the Earth. In an embodiment, the wireless sensor device may also use sensor data to detect large movements of the user's body, such as walking, jumping, or lying down.

In block 313, a device within the system, such as the computing hub, may receive, store, and process the sensor data. In an embodiment, the computing device may receive the sensor data via wireless transmissions from the wireless sensor device. In another embodiment, the sensor data may be sent by the wireless sensor device to the head-mounted wireless ranging devices, which may in turn transmit the data to the computing hub or an external computing device. In an embodiment, the received sensor data may be compared to recorded gesture information stored within the database of gesture movement patterns. Alternatively, the received sensor data may be analyzed in combination with other motion data, such as described above regarding the operations in blocks 308-312.

Figure 4:
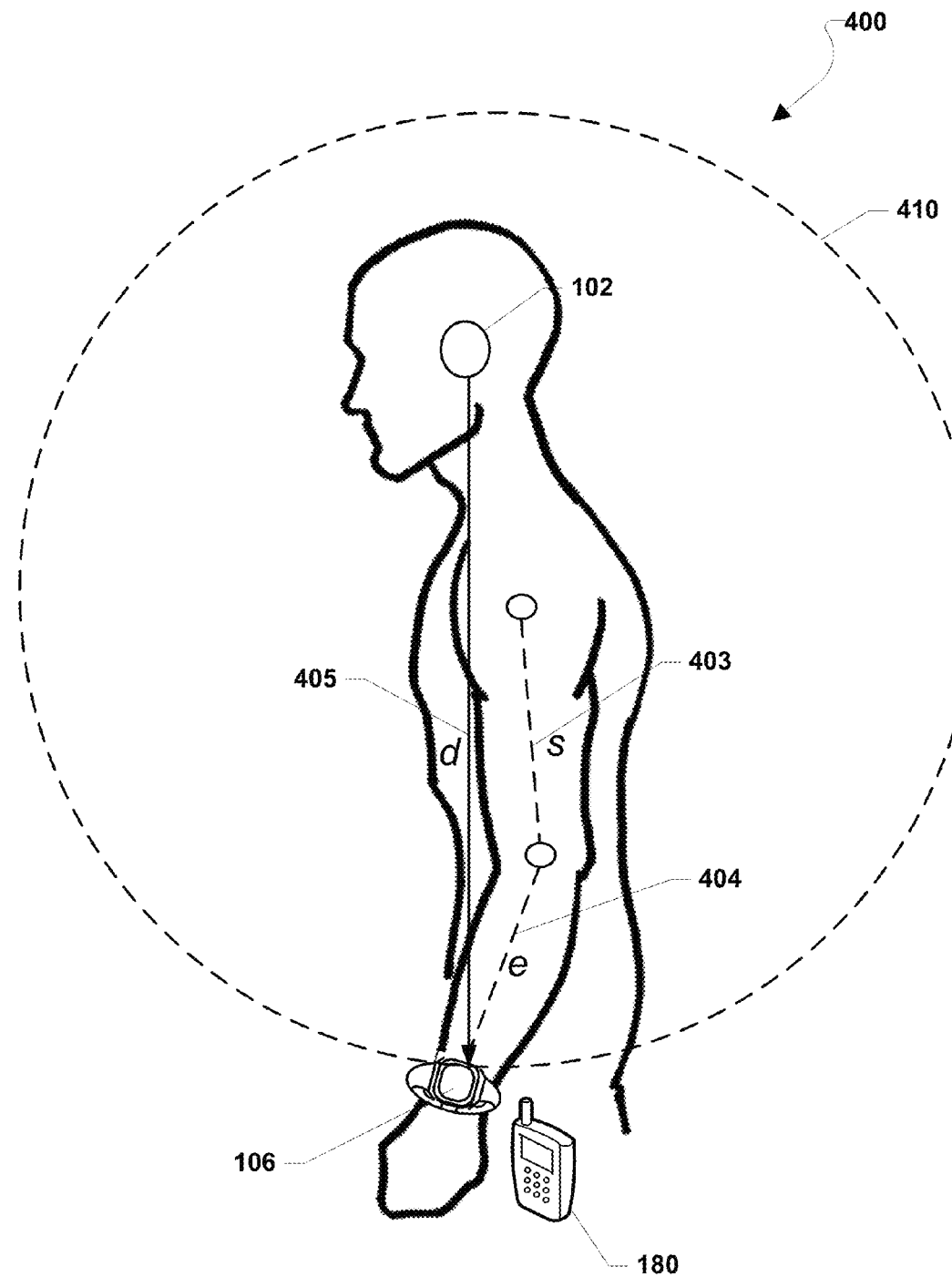
FIG. 4 is a diagram illustrating calibration parameters applicable to the various embodiments.

FIG. 4 illustrates anatomical parameters that may be factored into the processing of measured positions and accelerations of the wireless sensor devices 106. Calibration operations may be used to determine anatomical parameters of the user 400 while wearing head-mounted wireless ranging devices 102 and a wireless sensor device 106. The calibration operations may determine an anatomical range of motion of a user's arms to define a possible sphere of arm movement 410 (e.g., a "bounding area"). The calibration operations may determine an "at rest" or neutral pose of the user, including the default positions of his/her wrist (and wrist-mounted wireless sensor device 106) compared to his/her head and the ranging devices 102. The calibration measurements may also be used to estimate other anatomical measurements of the user, such as the distance (S) from the shoulder to the elbow 403 and the distance (e) from the elbow to the wrist 404, as well as other measurements, such as the default distance (d) 405 from one ranging device 102 to the wireless sensor device 106.

A computing hub 180, carried by the user (e.g., within a pocket or attached to a belt), may store the collected calibration measurements for use by the system. For example, the computing hub 180 may determine that current positional data for the user indicates that the wireless sensor device 106 is located outside of the bounding area 410 and therefore may be a data anomaly. In an embodiment, the computing hub 180 may conduct inverse kinematic analysis operations and estimate three-dimensional positioning information of the user's skeletal form, such as joint positions and angles. In an embodiment, the calibration operations may determine multiple poses of the user's anatomy. In an embodiment, the computing hub 180 may also estimate positional information about multiple aspects of the user's anatomy (e.g., legs, arms, chest, waist, head, neck, etc.). In an embodiment, any computing device within the system may perform the calibration functions and maintain the user calibration data.

Calibration operations may also include prescribed training routines to define or learn a set of predefined gestures that may be stored in the database of gesture movement patterns. The predefined gestures database may store positional and motion information for a set of gestures commonly executed by the user. To train the system, the user may be asked to make certain movements of his/her anatomy, such that the wrist-mounted wireless sensor device 106 moves in particular patterns. The computing hub 180 may receive and store the movement information collected by the system as it tracks the motion of the wireless sensor device 106 as gesture patterns within the predefined gestures database. For example, the computing hub 180 may store movement patterns for a list of commonly-used gestures, such as swiping (e.g., the wireless sensor device 106 moving from one side to the other), pulling (e.g., the wireless sensor device 106 moving from up to down), pushing (e.g., the wireless sensor device 106 moving away from the user's body), and pinching (e.g., two wireless sensor devices 106 coming together from separated positions).

Patterns stored within the predefined gestures database may have varying durations. For example, a particular gesture may be defined by a pattern of motion of the wireless sensor device 106 that lasts for several seconds. Patterns stored within the predefined gestures database may also include multiple movements of the wireless sensor device 106. For example, a gesture may include zigzag (i.e., back and forth) movements of the wireless sensor device 106. In an embodiment, the patterns stored within the predefined gestures database may be normalized patterns that represent common or average movement and duration information for particular gestures. The system may determine normalized patterns using data from numerous instances of a particular gesture performance by the user. For example, the system may require the user to train the system for a particular gesture by performing it several times. During this training process the position data from each performance may be recorded and analyzed by the system to create the normalized pattern. The normalized patterns may include statistical boundaries reflective of the variability in the user's performance, and such boundaries about the normalized position information may be used to recognize whether a collected series of positions falls within the normalized pattern for particular gestures. In an embodiment, information stored within the predefined gestures database may indicate whether gestures involve a single or multiple wireless sensor devices 106. In an embodiment, the computing hub 180 may store gesture information that is applicable to all users, and alternatively, may store gesture information that is particular to an individual user.

In an embodiment, the training and/or calibration operations may prompt the user to execute a predetermined set of particular actions. For example, the training and/or calibration operations running on the computing hub 180 may prompt the user to perform a movement pattern that the system may record and link to the input command for zooming-in on a digital map. In another embodiment, the user may define an unprompted or new gesture during the training and/or calibration operations. In an embodiment, the user may initiate the training and/or calibration routines, such as by tapping a GUI button displayed on the wireless sensor device 106 or the computing hub 180.

Figure 5A:
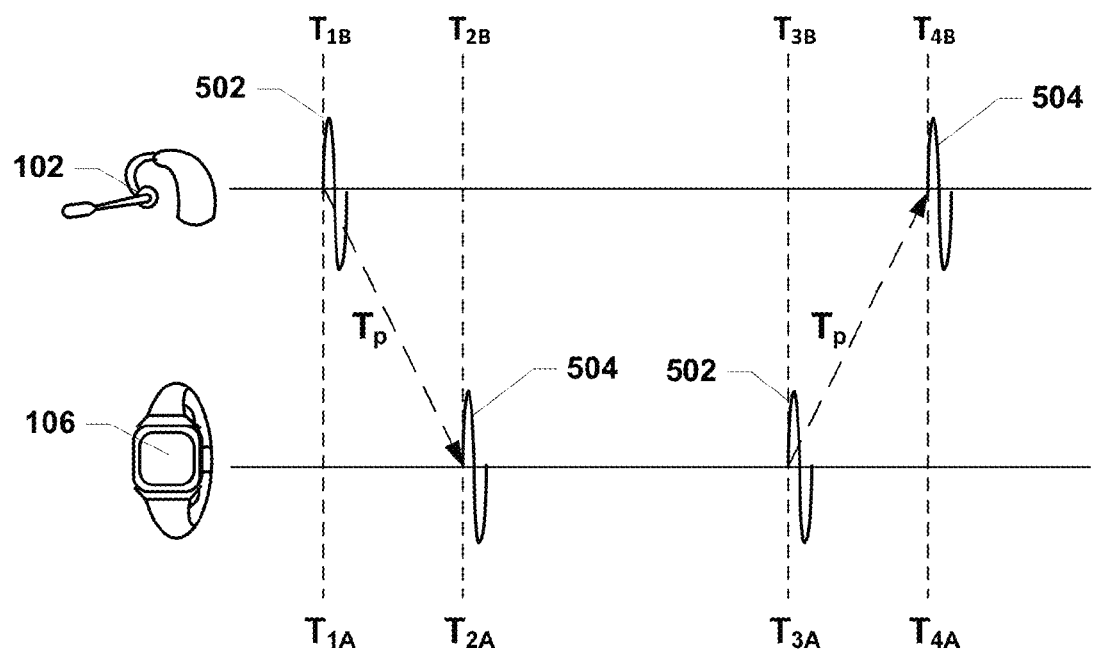
FIG. 5A is a diagram illustrating the two-way ranging concept for determining ranging information.

FIG. 5A illustrates a two-way ranging concept that may be used to estimate the physical distance between two Peanut® devices. A wireless sensor device 106 and a wireless ranging device 102 (as well as other system devices) may each contain Peanut® transceivers. Peanut® devices may exchange short-range signals of a specific pulse shape within the signal frequency band of 7.25-8.5 GHz with a channel size of approximately 1.25 GHz. Peanut® devices may utilize a Pulse Position Modulation scheme and a 64 bit preamble that is repeated multiple times regarding the detection of data packet reception. Peanut® devices typically include clock units that may be used in ranging estimation operations. Due to the channel size and small pulse size, Peanut® devices may determine ranging information accurate within a few centimeters (approximately +/−5 cm).

Peanut® devices may employ a ranging algorithm to estimate a physical distance between two Peanut® devices. The algorithm may calculate the time between when a wave 502 is transmitted and received 504. The Peanut® devices may measure the pulse arrival time (i.e., $T_{2A}$, $T_{4B}$) and transmission times (i.e., $T_{1B}$, $T_{3A}$) and estimate the roundtrip time without the need to canceling for the unknown offset between the two clocks. Distance may then be determined by multiplying the determined roundtrip time by the speed of light in air. In an embodiment, a processor in the system may use the following equation to estimate the roundtrip time:

$$2T_p = (T_{4B} - T_{1B}) - (T_{3A} - T_{2A})$$

where $T_{1B}$ is the departure time of a pulse from the wireless ranging device 102; $T_{2A}$ is the arrival time of the pulse at the wireless sensor device 106; $T_{3A}$ is the departure time of a pulse from the wireless sensor device 106; $T_{4B}$ is the arrival time of the pulse at the ranging device 102; and $T_p$ is the propagation delay for a one-way transmission.

Accurate estimation of the roundtrip may require finding the leading edge of a received pulse 504. In a multi-path embodiment, the leading path may not be line-of-sight and thus may be weaker than other paths.

Figure 5B:
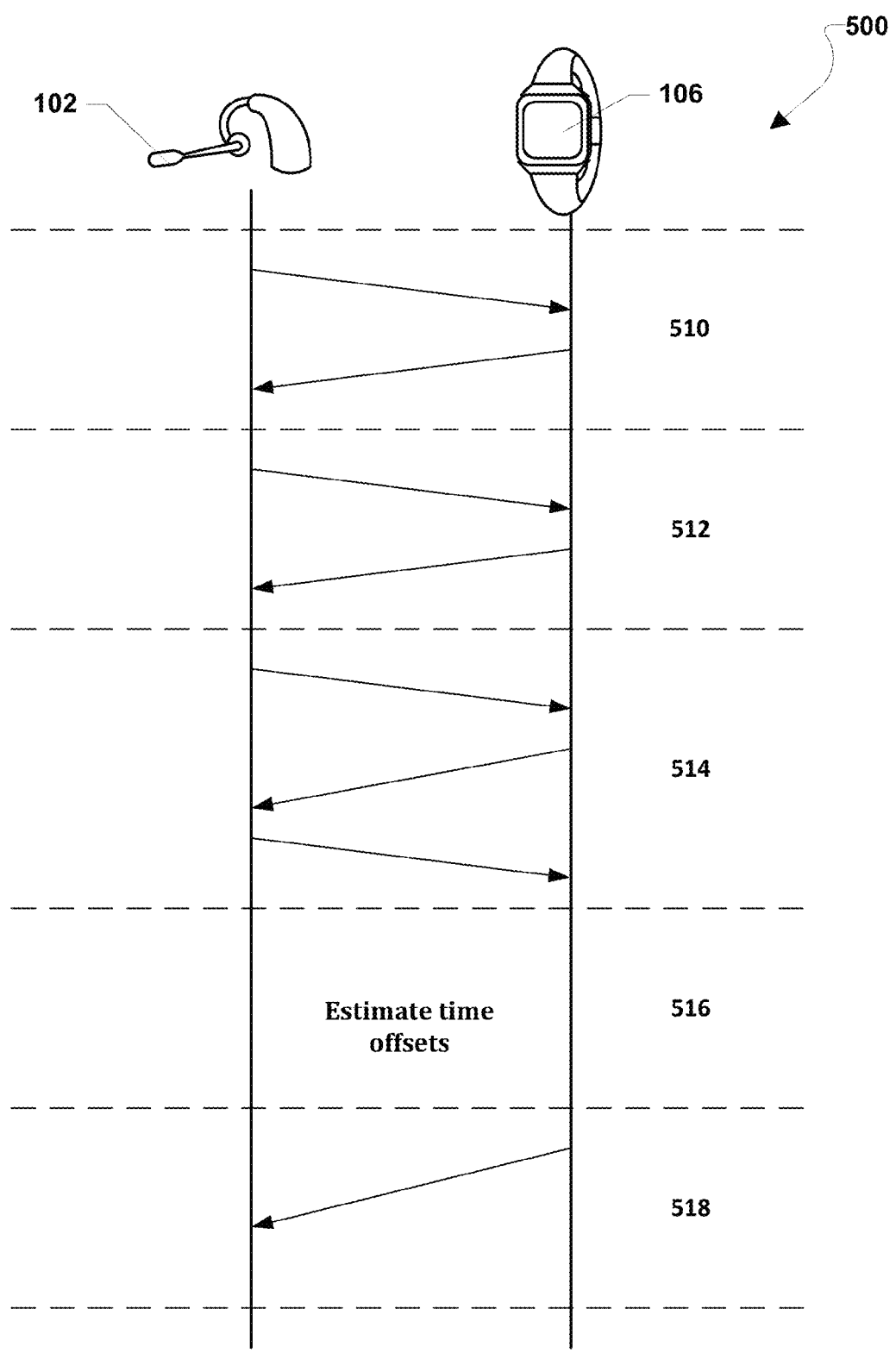
FIG. 5B is a communications diagram illustrating information flows in a method for determining ranging information.

FIG. 5B illustrates signal exchanges 500 that may be used by the system for estimating ranging information by two Peanut® transceiver devices. In operation 510, the ranging device 102 and the wireless sensor device 106 may establish a ranging channel by transmitting request and response signals on a common communication channel. In operation 512, the devices 102, 106 may exchange information over the ranging channel to estimate parameters for subsequent pulse determinations. In operation 514, data (e.g., timestamp information) necessary to compute the characteristics of received pulses may be collected by both devices 102, 106 as the devices 102, 106 send pulses over the ranging channel. In operation 516, the devices 102, 106 may each determine parameters that represent estimates of timing offsets describing pulse reception (e.g., time in between receiving a pulse and responding). In operation 518, the wireless sensor device 106 may transmit timing offset information to the ranging device 102 and/or vice-versa via the common communication channel, and the wireless ranging device 102 may compute the pulse roundtrip time. In an embodiment, Peanut® devices may also ensure accurate estimation of the roundtrip by adjusting signal-energy-based gain to limit errors due to saturation, and by estimating and cancelling clock drift of the two device clocks.

Further details regarding signaling and signal processing to accurately measure distance between two Peanut® devices are described in U.S. patent application Ser. Nos. 11/735,867, 12/887,659, 12/890,004, 12/875,262, and 11/777,237, all of which are incorporated herein by reference for such details.

Figure 5C:
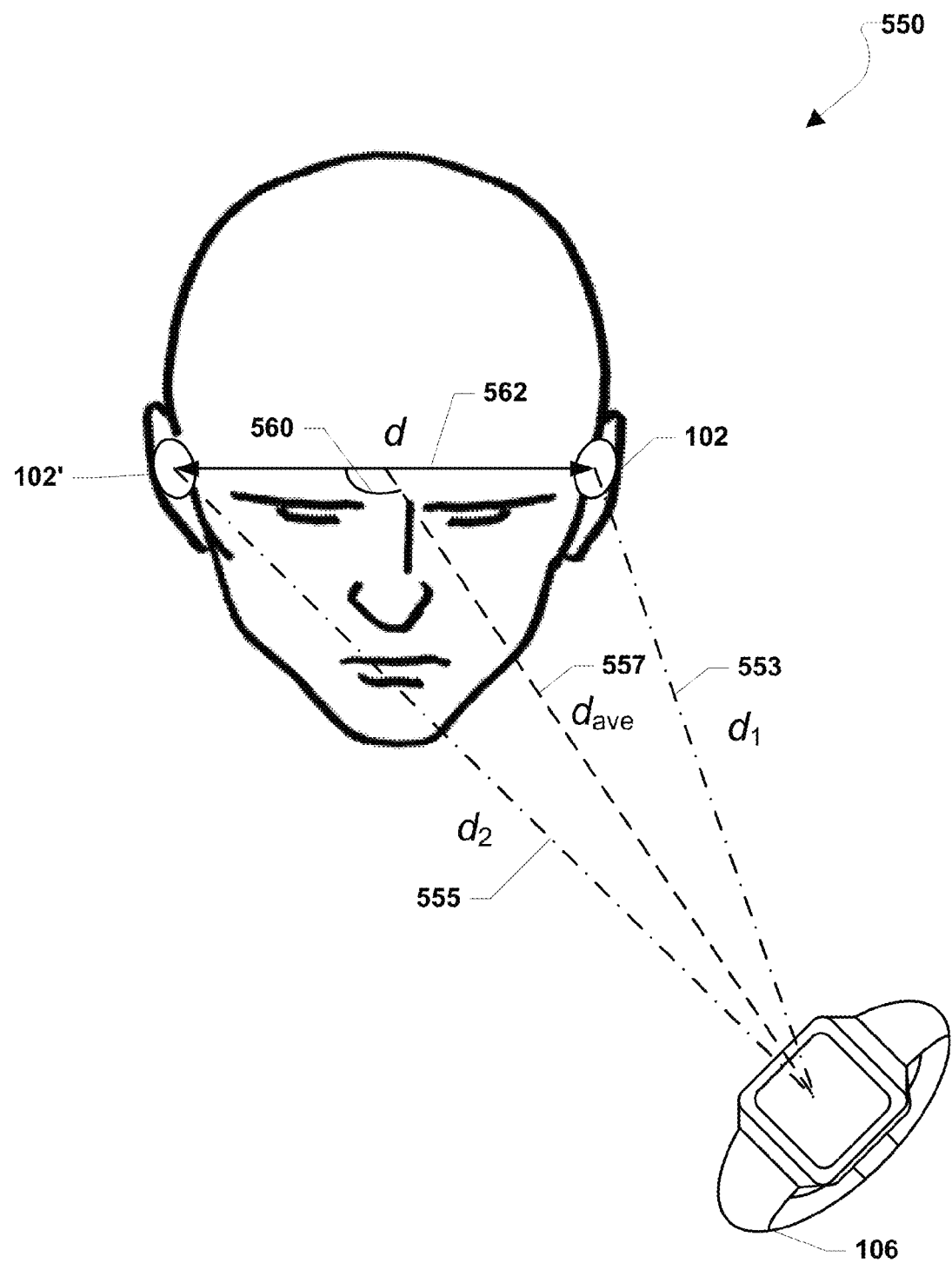
FIG. 5C is a diagram illustrating the angle of arrival of signals that may be calculated in the various embodiments.

FIG. 5C is a diagram illustrating mathematical operations 550 for estimating the angle of arrival 560 of short-range radio signals that may be used with the various embodiments. As described above, the base system may include two head-mounted wireless ranging devices 102, 102' and a wrist-mounted wireless sensor device 106. The ranging devices 102, 102' may be affixed to opposite sides of the user's head near the user's ears, so the ranging devices 102, 102' may form an axis 562 (i.e., x-axis) of a defined separation distance d.

Through the time-of-flight measurement operations described above, the ranging devices 102, 102' may determine their respective distances $d_1$ and $d_2$ to the wireless sensor device 106 at a given time t. The ranging devices 102, 102' may transmit the time and distance information (e.g., t, d, $d_1$, and $d_2$) to another computing device, such as a computing hub, via short-range radio transmission (e.g., Peanut®, Bluetooth®, Zigbee® radio signals), for angle of arrival calculations. In another embodiment, angle of arrival calculations may be conducted within the ranging devices 102, 102' or the wireless sensor device 106. In another embodiment, the determination of the wireless sensor device 106 coordinates may be done by the computing hub individually or in combination by a remote server, the ranging devices 102, 102', and the wireless sensor device 106.

Whichever computing device performing the angle of arrival calculation may execute a software routine on its processor that calculates the angle of arrival 560 based on the received distance information. In an embodiment, the computing hub may calculate the angle of arrival 560 using the following equation:

$$\text{Angle of arrival at time } t = \cos^{-1}\left(c\frac{x}{d}\right)$$

where: t=time; c=speed of light in air; x=$d_1$–$d_2$; and d=separation distance between the two ranging devices 102, 102'. In an embodiment, the variable c may represent the constant value representing the speed of light (i.e., 299,792,458 meters per second).

The computing hub may use the angle of arrival 560 in combination with the ranging information to determine position coordinates for the wireless sensor device 106 at the particular time t. The collected angle of arrival 560 may be stored or processed along with the distance measurements $d_1$, $d_2$ or with an average distance $d_{ave}$ 557. The result may be in the form of a two dimensional polar coordinate that may be stored or linked to the time interval t.

It is worth noting that the distance measurements and angle of arrival calculation will result in two solutions for the angle of arrival, one placing the wireless sensor device 106 in front of the user and the other placing the wireless sensor device 106 behind the user. Since only one of these solutions makes sense, the other solution (i.e., the larger angle) may be discarded.

Figure 6:
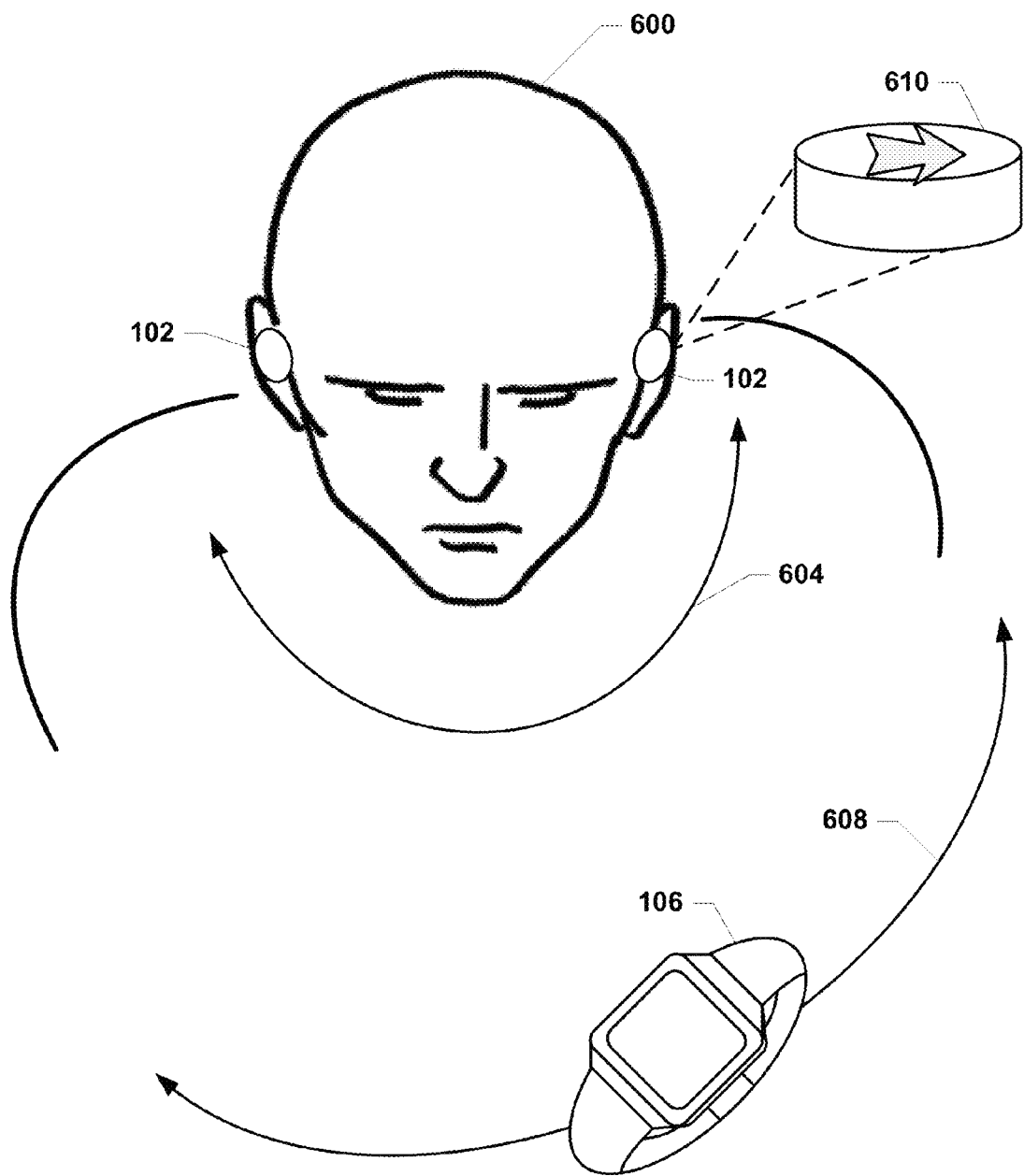
FIG. 6 is a diagram illustrating user and device movements that may be measured or calculated in the various embodiments.

FIG. 6 is a diagram illustrating user and device movements that may be tracked by the system in the various embodiments. Based on ranging and angle of arrival measurements calculated through the operations described above, the system may determine positions of the wireless sensor devices 106 relative to the user's head 600 in terms of distance and angle of arrival. In an embodiment, the computing hub may not detect whether the wireless sensor device 106 is in front of or behind the user, as distance and angle measurements may describe several locations relative to the user head 600. For example, the computing hub may determine the wireless sensor device 106 is a certain distance from the user's head 600 and oriented at a certain angle with respect to the axis 562 passing through the user's head 600.

In the embodiment illustrated in FIG. 6, the head-mounted wireless ranging devices 102 may include a magnetometer and/or gyroscope units 610 that provide directional information with respect to an external reference frame, such as the Earth's magnetic field. The system may use magnetometer and/or gyroscope unit 610 measurements, which may be transmitted via radio signals (e.g., Peanut®, RF radio) by the ranging devices 102, to determine the orientation of the user's head 600 (i.e., the direction the user is facing with respect to magnetic north, for example). Based on the orientation information in combination with ranging and angle of arrival information, the system may account for movement of the user's head 600 during motion tracking. In an embodiment, the ranging devices 102 may include a sensor suite of multi-axis accelerometers and gyroscopes that can recognize the gravity vector, enabling the system to determine if the user is looking up or down. In an embodiment, the system may receive directional or referential positioning information, such as frame-of-reference coordinates (e.g., coordinates generated by a GPS device), from other wireless devices having radio signal transceivers (e.g., a laptop computer).

In an embodiment, the system may also use directional information to recognize movement measurements that represent motion patterns of the user's head and not the user's hands. The user's head 600 may rotate 604 independent of motions 608 of the wireless sensor device 106. For example, when the user rotates his/her head 600 several degrees while the wireless sensor device 106 remains motionless, the system will detect changes in ranging and angle of arrival, even if the hands did not move. The system may use directional measurements from magnetometer and/or gyroscope units 610 within the ranging devices 102 to track independent user head rotations 604 over time. The system may use such directional information to differentiate user head rotations 604 from motion of the wireless sensor device 106. The system may remove such user head rotations 604 information from positional information of the wireless sensor device 106 (i.e., determine positions sequence). Alternatively, head rotations may be combined with arm positions and/or movements within the database of gesture movement patterns.

Figure 7A:
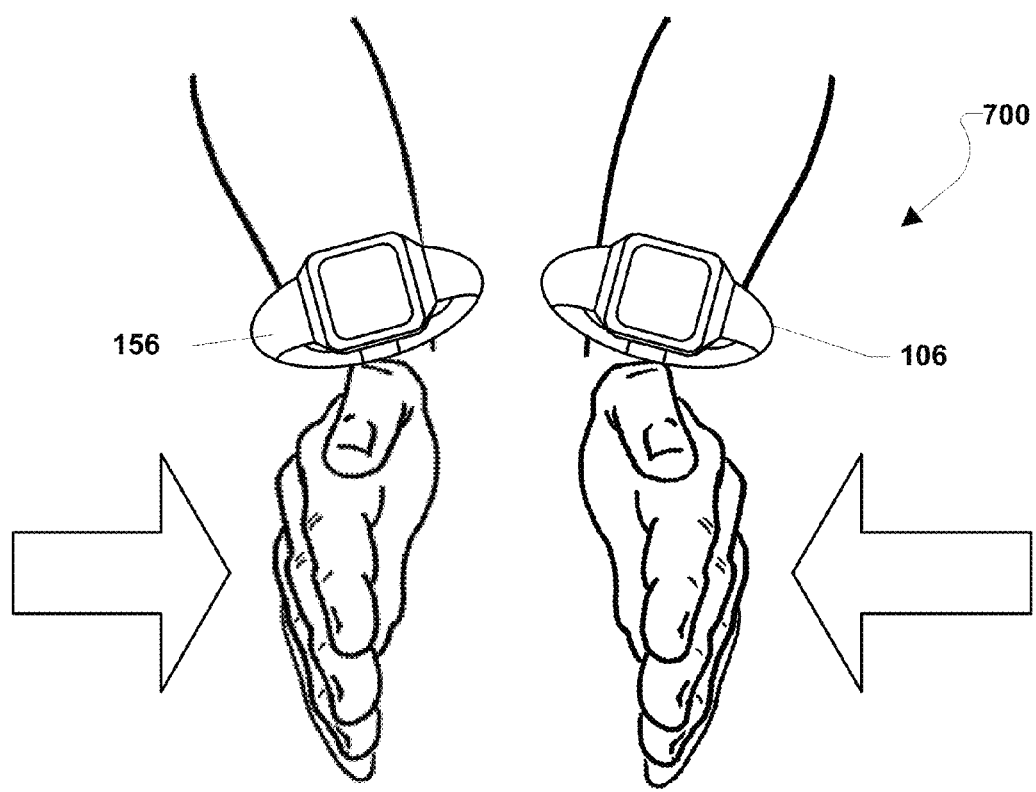
FIGS. 7A-C are illustrations of gesture actions that may be recognized using the various embodiments.

FIG. 7A illustrates an example gesture action 700 that may be used with the various embodiments. In the embodiment, the user may employ two wrist-mounted wireless sensor devices 106, 156. To accomplish this gesture the user may move his/her wrists together, such that the left wrist may move in a rightward direction and the right wrist may move in a leftward direction. For example, the user may move his/her wrists as if he intended to touch his/her hands together near the center of his/her body. The wireless sensor devices 106, 156 may communicate via short-range radio transmissions (e.g., Peanut® radio signals) with head-mounted wireless ranging devices or other wireless ranging device implementations, such as a belt having at least two Peanut® transceivers separated by a fixed distance (e.g., the width of the user's waist). The system may use such transmissions to determine positional and movement information of the wireless sensor devices 106, 156 based on the ranging and angle of arrival determinations described above. In an embodiment, the system may also include motion sensor measurements (e.g., data from accelerometers and gyroscopes) in the determined movement information. The system may analyze the movement information of both wireless sensor devices to determine a single gesture as opposed to a separate gesture from each of the individual wireless sensor devices 106, 156. For example, the system may determine the gesture action 700 involving both wireless sensor devices 106, 156 to be a single pinch or squeeze gesture, as opposed to two swipe gestures.

Figure 7B:
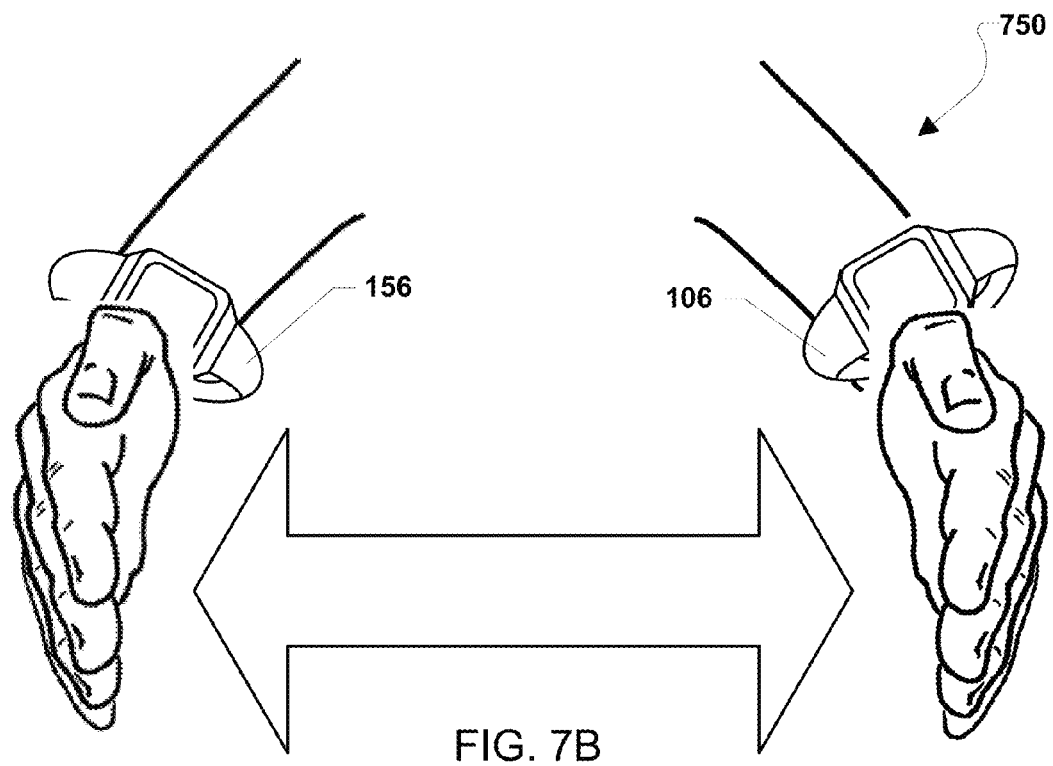

FIG. 7B illustrates another example gesture action 750 that may be used with the various embodiments. To accomplish this gesture, the user may move his/her wrists apart, such that the left wrist may move in a leftward direction and the right wrist may move in a rightward direction. For example, the user may move his/her wrists as if he intended to separate his/her hands from an original touching position. In an analysis similar to that described above, the system may recognize a single gesture action using movement information based on ranging and angle of arrival determinations derived from short-range radio transmissions (e.g., Peanut® radio signals) between wireless ranging devices and the wireless sensor devices 106, 156. For example, the system may determine the gesture action 750 involving both wireless sensor devices 106, 156 to be a single stretch gesture, as opposed to two swipe gestures.

Figure 7C:
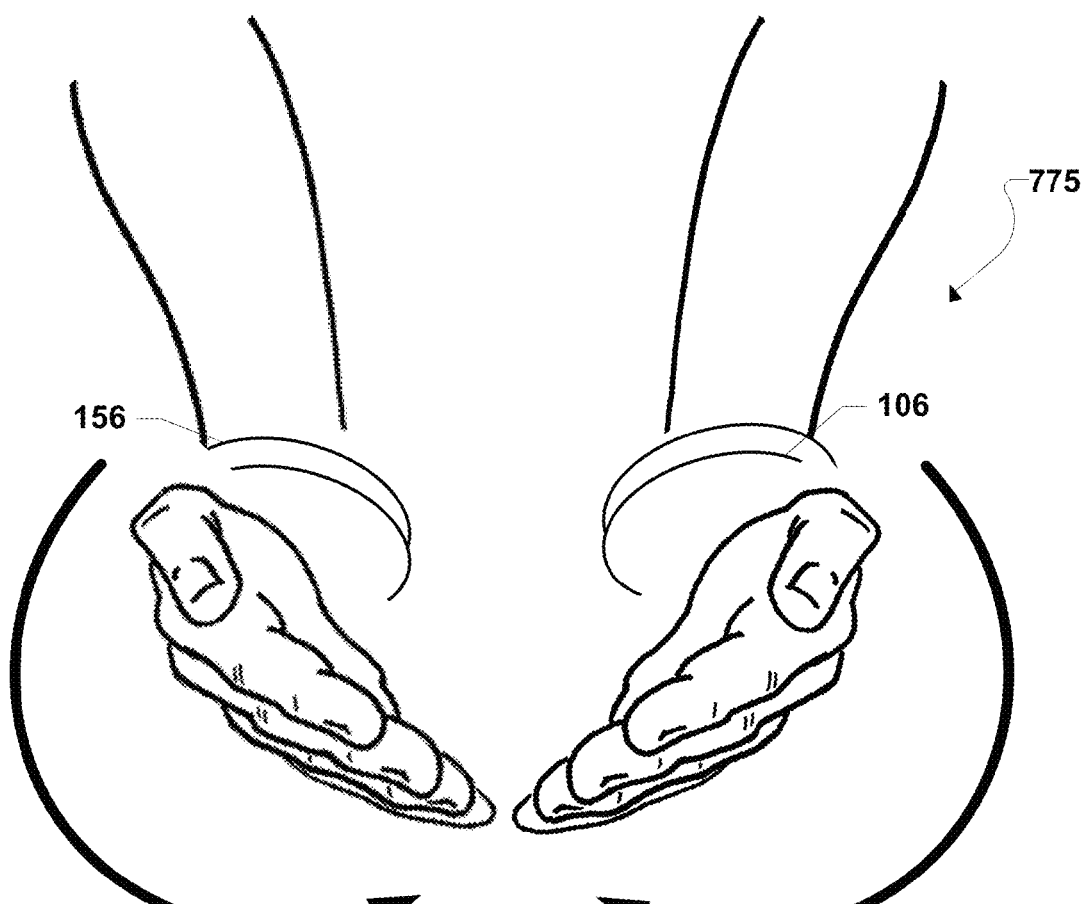

FIG. 7C illustrates another example gesture action 775 that may be recognized with the various embodiments. To accomplish this gesture, the user may rotate his/her right wrist counter-clockwise and his/her left wrist clockwise. For example, the user may move his/her wrists as if he intended to imitate opening a book. The system may recognize a single gesture action using movement information based on ranging and angle of arrival determinations, as described above, and may additionally analyze sensor data from accelerometers and gyroscopes located within the wireless sensor devices 106, 156. For example, the system may determine the gesture action 775 involving both wireless sensor devices 106, 156 to be a single gesture for opening an e-reader application.

Figure 8A:
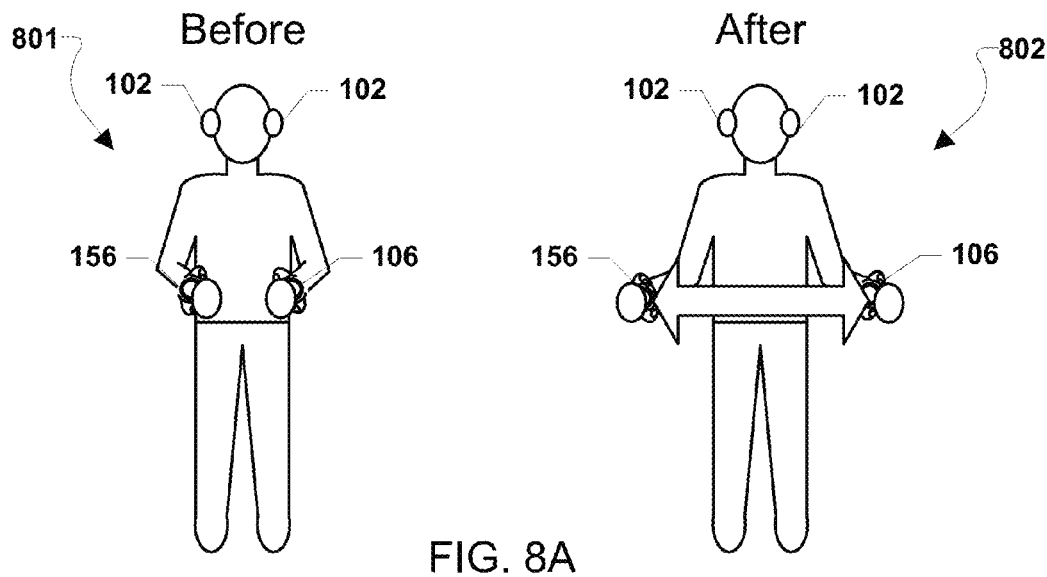
FIGS. 8A-8C are block diagrams illustrating gesture actions that may be recognized using the various embodiments.

FIG. 8A illustrates another example gesture action performed by a user that may be used with the various embodiments. Based on ranging information determined by operations described above, the system may determine user gestures in spatial context of the user's entire body. For example, the system may distinguish between similar hand movements performed above and below the head. To enable such vertical measurements, the user may wear one or more additional Peanut® transceivers, located at relatively fixed places on his/her body, such as on a foot (or shoe). In an embodiment, the additional Peanut® transceiver may be perpendicularly displaced from the axis between the other wireless ranging devices 102. Distance measurements to the wireless sensor devices 106, 156 from such an additional Peanut® transceiver may provide additional ranging information via short-range signal transmissions to the system. The system may use the additional ranging information to differentiate similar hand movements performed at different elevations with respect to the user's feet.

The "before" representation 801 displays the user in a neutral position with his/her hands at waist level and close to his/her body. In an embodiment, the system may determine the position shown in the before representation 801 to be a neutral position at a waist level that may be the beginning of a gesture. In the "after" representation 802, the user has laterally extended his/her hands outward, maintaining his/her hands at the same waist level. The system may determine this action to be an outward movement from the initial position shown in the "before" representation 801. In an embodiment, the system may compare the outward movement to patterns within a predefined gestures database to determine if there is an approximate match. For example, such an outward movement may be interpreted by the computing device as a zoom-in command. The system may further contextualize the outward movement by recognizing the waist level of the hands, before and after the gesture. For example, the system may determine via comparisons to recorded gestures within a database that the outward movement at waist level is a fast zoom-in input command.

Figure 8B:
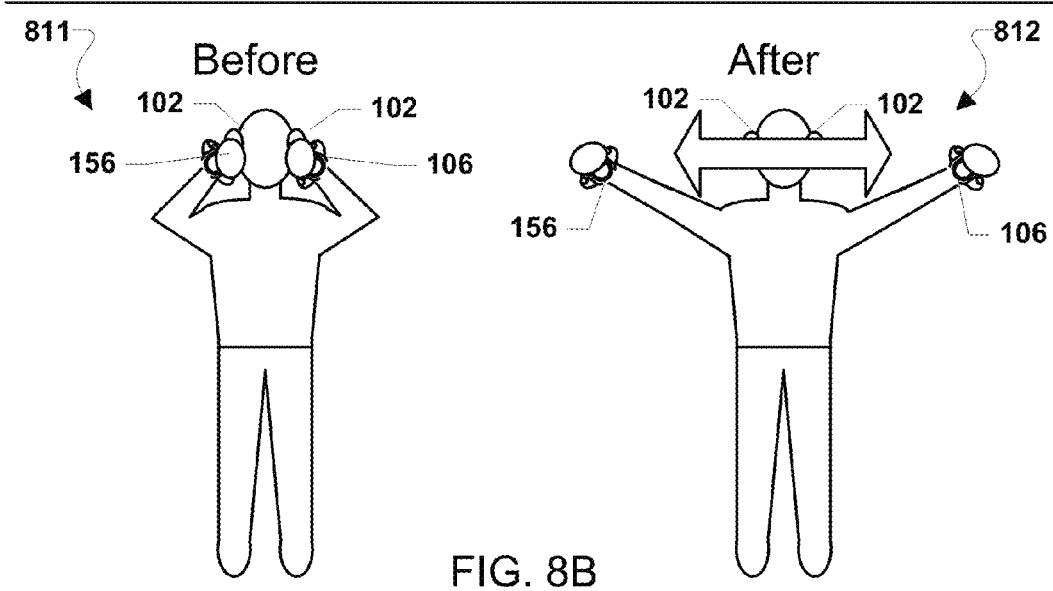

FIG. 8B illustrates another example gesture action performed by a user that may be used with the various embodiments. The "before" representation 811 and "after" representation 812 are similar to those described above with reference to FIG. 8A except that the user positions his/her hands at head level before and after the movement. The system may determine the lateral movement at head level to be an outward movement from the initial position shown in the "before" representation 811 in the head level spatial context. As an example, the system may determine the outward movement at head level is a delete input command (e.g., within an operating system, delete the currently selected file item).

Figure 8C:
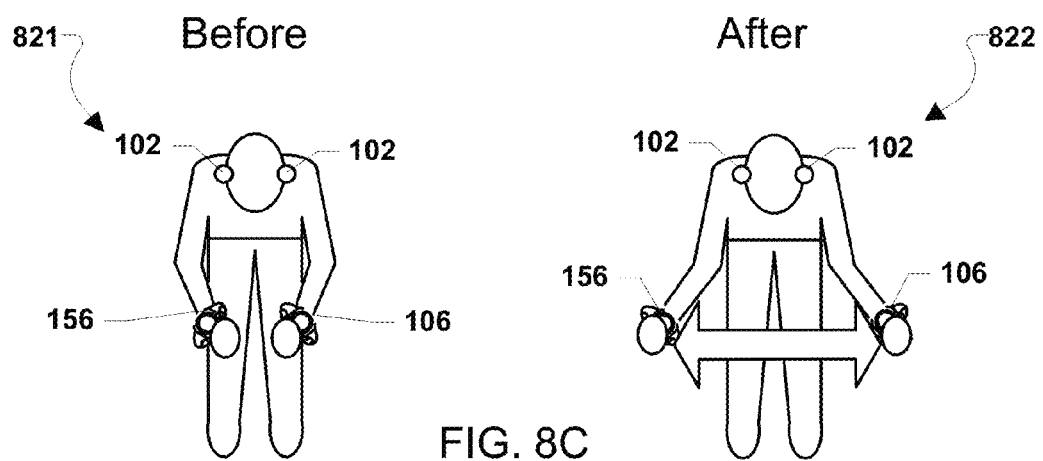

FIG. 8C illustrates another example gesture action performed by a user that may be used with the various embodiments. The "before" representation 821 and "after" representation 822 are similar to those described above with reference to FIG. 8A except that the user positions his/her hands at knee level before and after the movement. The system may determine the lateral movement at knee level to be an outward movement from the initial position shown in the "before" representation 821 in the knee level spatial context. As an example, the system may determine the outward movement at knee level is a shut-down input command (i.e., turn off the computer controlled via the input). In an embodiment, the system may determine the spatial context of the wireless sensor devices 106, 156 based on measurements from accelerometers/gyroscopes/gravitometers located within the head-mounted wireless ranging devices 102 that may be interpreted in order to discern information regarding the orientation of the user's head. For example, the system may recognize the user is looking down (e.g., the user is in a bent-over posture) based on gravity vector measurements made by sensors in the ranging devices (or a headset) and may interpret subsequent hand movement information in the context of the user's knee level.

Figure 8D:
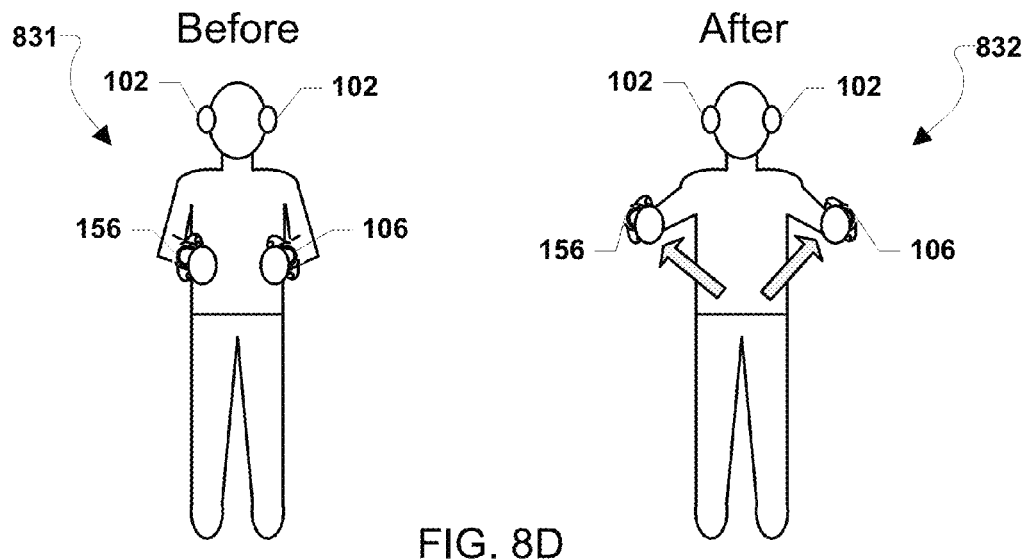
FIGS. 8D-8F are illustrations of a gesture action from three angles that may be recognized using the various embodiments.
Figure 8E:
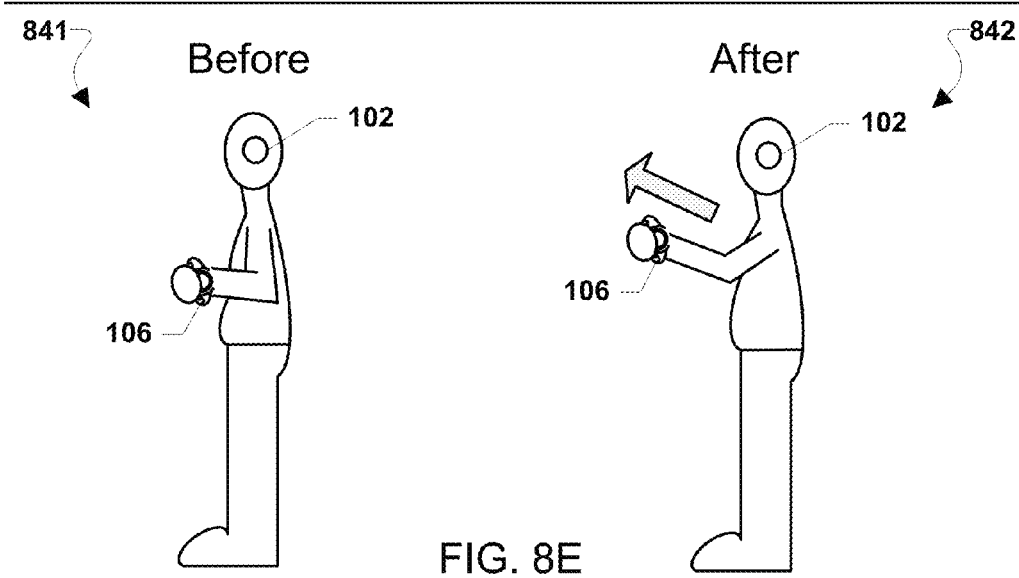
Figure 8F:
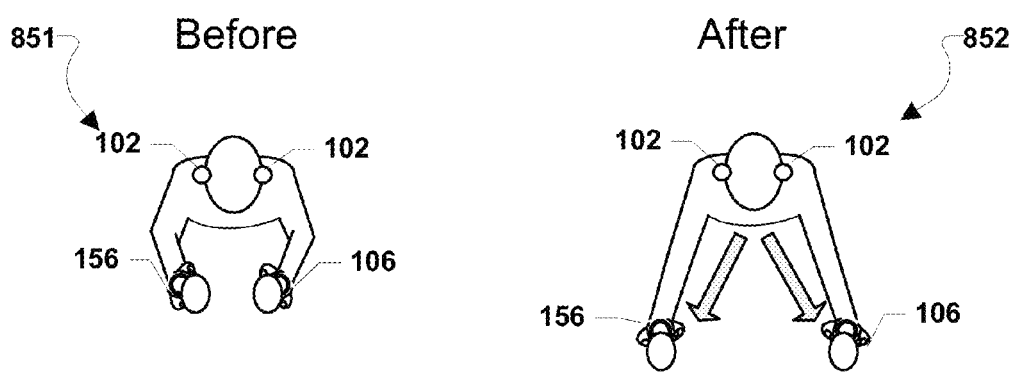

FIGS. 8D-8F illustrate three perspectives of a single gesture action performed by a user that may be used with the various embodiments. The system may determine ranging and angle measurements as illustrated in FIGS. 8D-8F as described above with reference to FIG. 8A. Such measurements may include three-dimensional positioning information which the system may determine without requiring special user placement in an environment. For example, the system may determine user movements in many axes of movement without requiring the user to position his/her body within a particular range or angle of a camera or lighting equipment.

FIG. 8D shows an angle of view directly facing the front of the user revealing movements in the x and y axes. The "before" representation 831 shows the user with his/her hands, with wrist-mounted wireless sensor devices 106, 156, at mid-section level on the y axis and close together at the center of the x axis. In the "after" representation 832, the user has moved his/her hands to a higher level on the y axis, closer to the head-mounted wireless ranging devices 102 than in the "before" representation 831. The "after" representation 832 also illustrates that the user has moved his/her hands farther apart on the x axis.

FIG. 8E shows an angle of view facing the profile of the user revealing movements in the z and y axes. The "before" representation 841 shows the user with his/her hands, with wrist-mounted wireless sensor devices 106 at mid-section level on the y axis and close to his/her body on the z axis. In the "after" representation 842, the user has moved his/her hands to a higher level on the y axis, closer to his/her head than in the "before" representation 841. The "after" representation 842 also illustrates that the user has moved his/her hands away from his/her body on the z axis, as if pushing forward.

FIG. 8F shows an angle of view facing the top of the user revealing movements in the z and x axes. The "before" representation 851 shows the user with his/her hands, with wrist-mounted wireless sensor devices 106, 156 close to his/her body on the z axis and near each other at the center of the x axis. In the "after" representation 852, the user has pushed his/her hands away from his/her body on the z axis and farther apart on the x axis.

The various embodiments encompass a system that enables a user to efficiently control computing devices using intuitive body gestures determined through short-range radio signal ranging operations. In an example use case, the user, employing a headset device that includes two Peanut® transceivers (e.g., eyeglasses with Peanut® units affixed to both temples) and a wristwatch that includes a Peanut® transceiver operate a laptop computer previously configured to interact with the user's headset via wireless transmissions (e.g., Peanut®, Bluetooth®, or Zigbee® radio signals) without previous set up or calibration. When the user walks close to the laptop computer, the laptop computer may begin exchanging transmissions with the headset, which in turn may initialize the Peanut® transceivers in the headset and the watch. When the user raises his/her arm with the watch over his/her head, this may be interpreted as a start command by the laptop which may start executing a slide presentation. When the user swipes his/her arm with the watch to the left, the laptop computer may progress to the next slide in the presentation. When the user swipes his/her arm with the watch to the right, the laptop computer may regress back one slide. Without moving his/her arm, the user may nod his/her head forward, and the laptop computer may do nothing. With his/her head still forward, the user may swipe his/her arm with the watch to the right, and the laptop computer may take a screen shot of the current presentation display. When the user swipes his/her arm with the watch to the left at waist level, the laptop may close the presentation application. As the user walks out of the room, the laptop may enter into a standby mode. These example gestures are provided as an example of the utility of the various embodiments.

Figure 9:
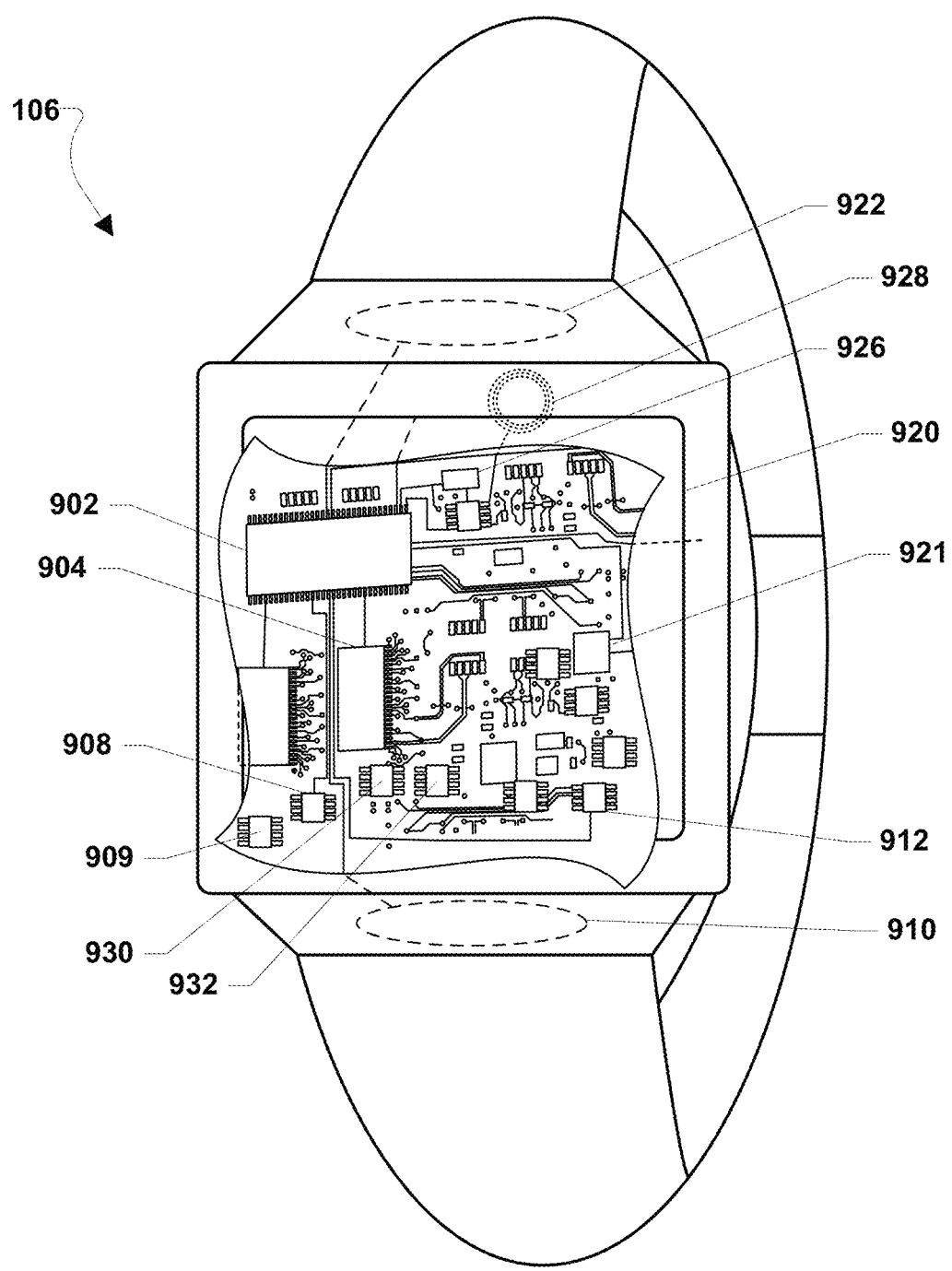
FIG. 9 is a component block diagram of an example wireless sensor device suitable for use with the various embodiments.

The various embodiments described above may be implemented within a variety of wireless wrist devices, such as a wrist watch type wireless sensor device 106 as illustrated in FIG. 9. A wireless sensor device 106 may include a processor 902 coupled to internal memory 904. The internal memory 904 may be volatile or non-volatile memory, and may also be secure and/or encrypted memory, or unsecure and/or unencrypted memory, or any combination thereof. The processor 902 may also be coupled to a touch screen display 920, such as a resistive-sensing touch screen, capacitive-sensing touch screen infrared sensing touch screen, or the like. Additionally, the wireless sensor device 106 may include a Peanut® transceiver 908, another short-range radio transceiver 909 (e.g., Bluetooth®, Zigbee®, RF radio) and antennas 921 for sending and receiving wireless signals as described herein. The transceivers 908, 909 and antennas 921 may be used with the above-mentioned circuitry to implement the various wireless transmission protocol stacks/interfaces. The wireless sensor device 106 may also include physical buttons 922 and 910 for receiving user inputs. The wireless sensor device 106 may also include various motion sensors, such as a suite of accelerometers 912, gyroscopes 932, and an electronic compass 930 coupled to the processor 902. The wireless sensor device 106 may include a battery 926 and a microphone 928 to receive audio input, all of which may be coupled to the processor 902.

Figure 10:
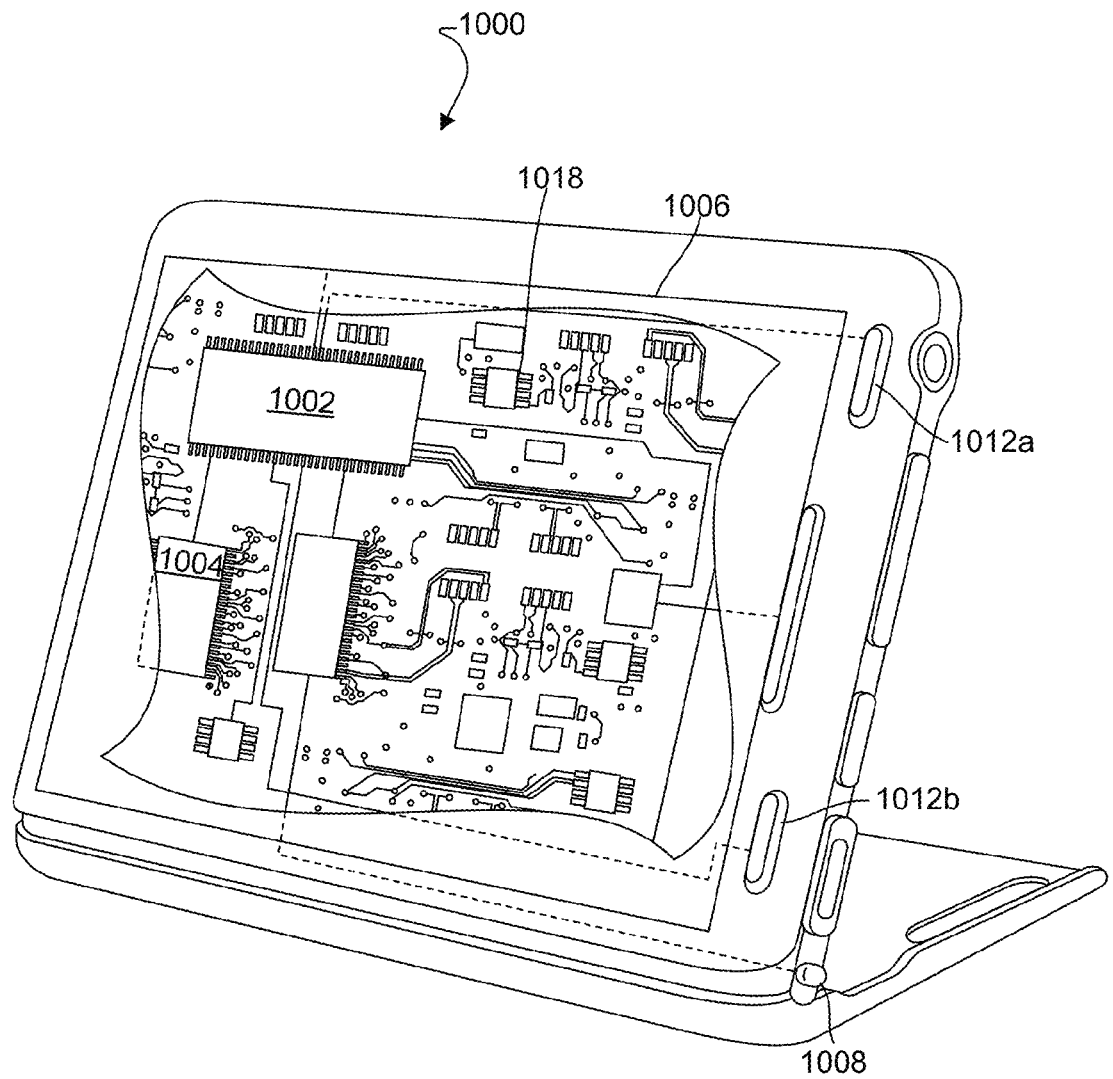
FIG. 10 is a component block diagram of an example wireless mobile device suitable for use with the various embodiments.

The various embodiments may be implemented in any of a variety of mobile devices, an example of which is illustrated in FIG. 10. For example, the mobile device 1000 may include a processor 1002 coupled to internal memory 1004. The internal memory 1004 may be volatile or non-volatile memory, and may also be secure and/or encrypted memory, or unsecure and/or unencrypted memory, or any combination thereof. The processor 1002 may also be coupled to a touch screen display 1006, such as a resistive-sensing touch screen, capacitive-sensing touch screen infrared sensing touch screen, or the like. Additionally, the display of the mobile device 1000 need not have touch screen capability. The mobile device 1000 may have a short-range radio signal transceiver 1018 (e.g., Peanut®, Bluetooth®, Zigbee®, RF radio) and antennas 1008 for sending and receiving wireless signals as described herein. The transceiver 1018 and antennas 1008 may be used with the above-mentioned circuitry to implement the various wireless transmission protocol stacks/interfaces. The mobile device 1000 may also include physical buttons 1012a and 1012b for receiving user inputs.

Figure 11:
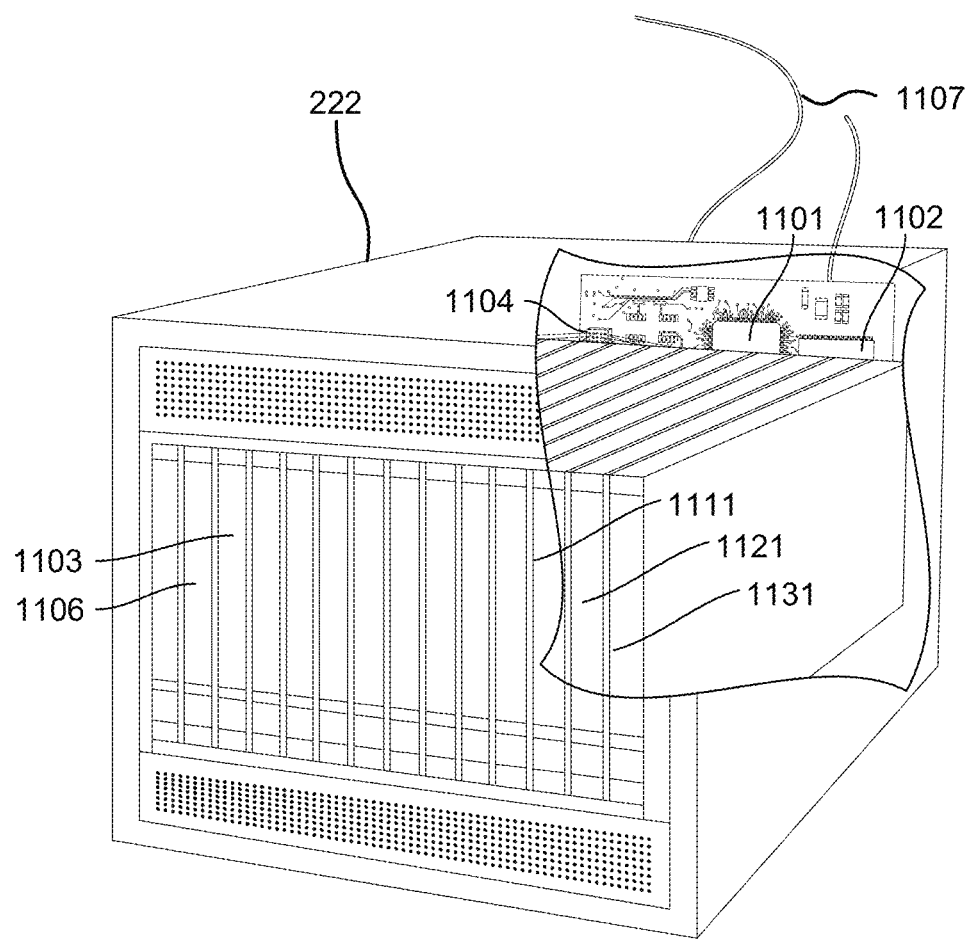
FIG. 11 is a component block diagram of an example server computing device suitable for use with the various embodiments.

The various embodiments may also be implemented on any of a variety of commercially available server devices, such as the server 222 illustrated in FIG. 11. Such a server 222 typically includes a processor 1101, and may include multiple processor systems 1111, 1121, 1131, one or more of which may be or include multi-core processors. The processor 1101 may be coupled to volatile internal memory 1102 and a large capacity nonvolatile memory, such as a disk drive 1103. The server 222 may also include a floppy disc drive, compact disc (CD) or DVD disc drive 1104 coupled to the processor 1101. The server 222 may also include network access ports 1106 coupled to the processor 1101 for establishing network interface connections with a network 1107, such as a local area network coupled to other broadcast system computers and servers.

Figure 12:
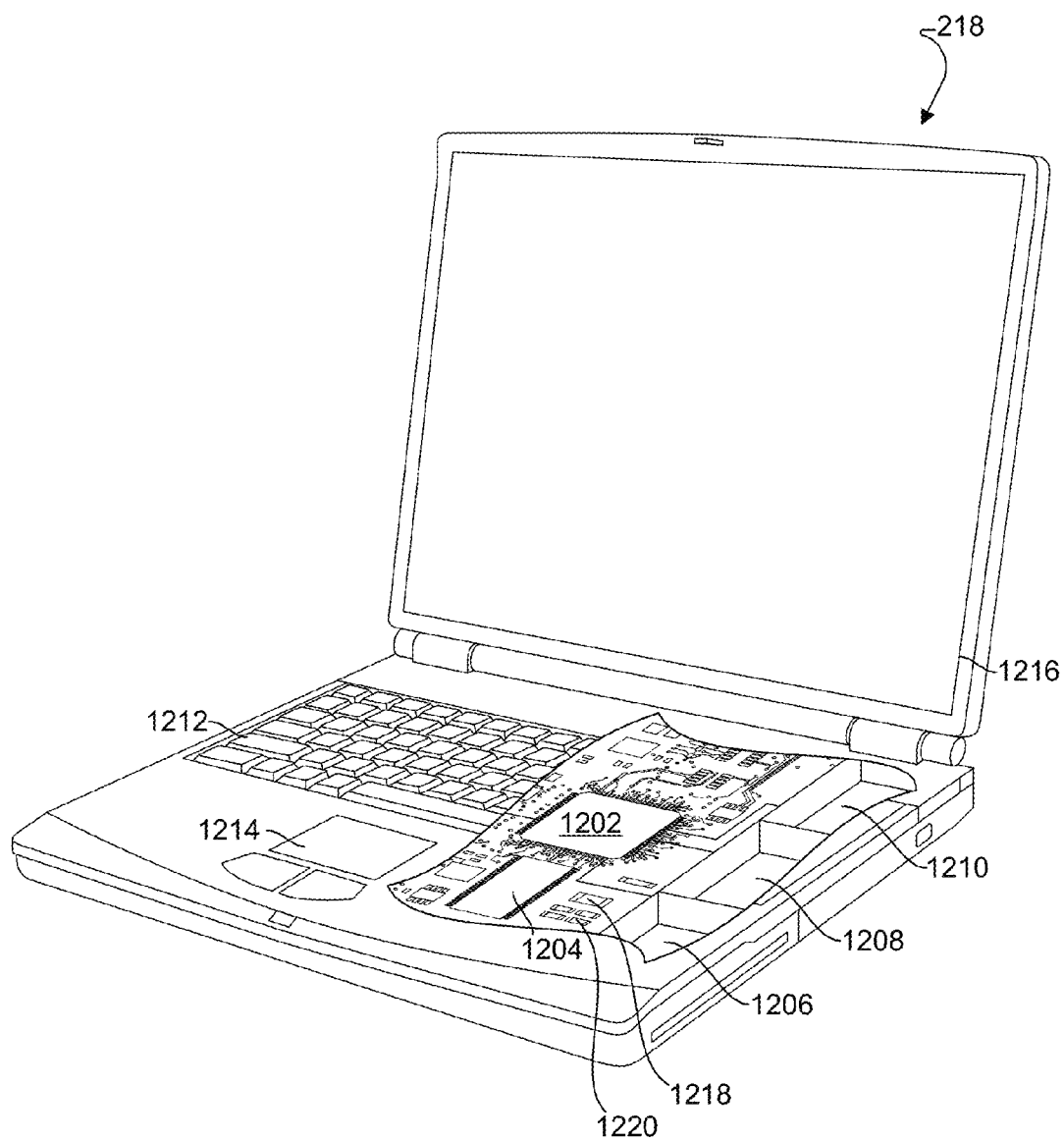
FIG. 12 is a component block diagram of an example laptop computing device suitable for use with the various embodiments.

Other forms of computing devices, including personal computers and laptop computers, may be used to implement the various embodiments. Such computing devices typically include the components illustrated in FIG. 12 which illustrates an example personal laptop computer 218. Many laptop computers include a touchpad touch surface 1214 that serves as the computer's pointing device, and thus may receive drag, scroll, and flick gestures similar to those implemented on mobile computing devices equipped with a touch screen display and described above. Such a personal laptop computer 218 generally includes a processor 1202 coupled to volatile internal memory 1204 and a large capacity nonvolatile memory, such as a disk drive 1206. The laptop computer 218 may also include a compact disc (CD) and/or DVD drive 1208 coupled to the processor 1202. The laptop computer 218 may also include a number of connector ports 1210 coupled to the processor 1202 for establishing data connections or receiving external memory devices, such as a network connection circuit for coupling the processor 1202 to a network. The laptop computer 218 may have a short-range radio signal transceiver 1218 (e.g., Peanut®, Bluetooth®, Zigbee®, RF radio) and antennas 1220 for sending and receiving wireless signals as described herein. The transceiver 1218 and antennas 1220 may be used with the above-mentioned circuitry to implement the various wireless transmission protocol stacks/interfaces. In a laptop or notebook configuration, the computer housing includes the touchpad 1214, the keyboard 1212, and the display 1216 all coupled to the processor 1202. Other configurations of the computing device may include a computer mouse or trackball coupled to the processor (e.g., via a USB input) as are well known, which may also be use in conjunction with the various embodiments.

Figure 13:
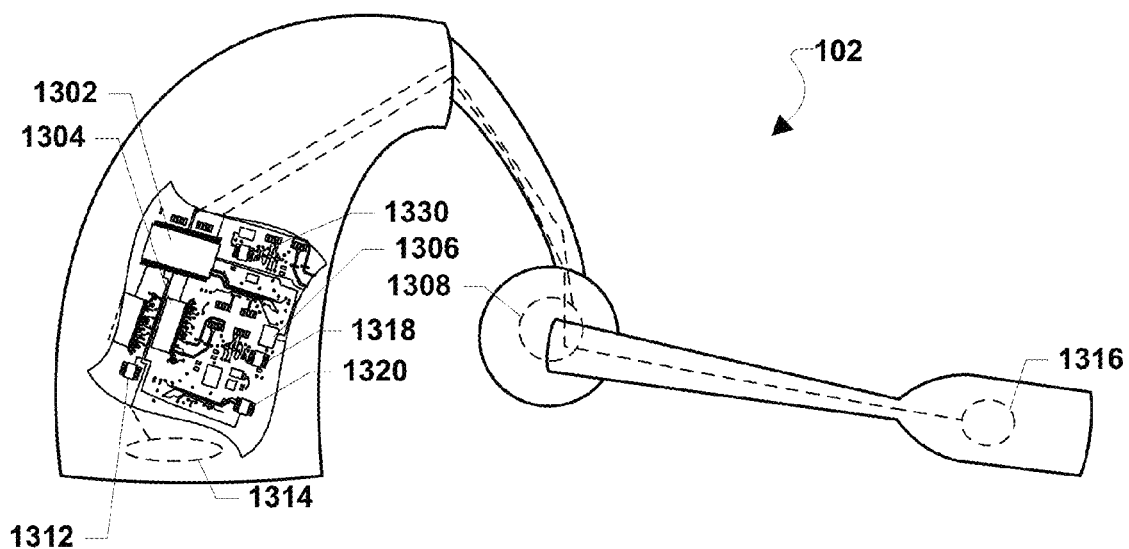
FIG. 13 is a component block diagram of an example wireless ranging device suitable for use with the various embodiments.

The various embodiments described above may also be implemented within a variety of wireless ranging devices, such as a head-mounted wireless ranging device 102 illustrated in FIG. 13. The wireless ranging device 102 may include a processor 1302 coupled to internal memory 1304. The internal memory 1304 may be volatile or non-volatile memory, and may also be secure and/or encrypted memory, or unsecure and/or unencrypted memory, or any combination thereof. The wireless ranging device 102 may include a physical button 1314 for receiving user inputs.

Additionally, the wireless ranging device 102 may include a Peanut® transceiver 1330, another short-range radio signal transceiver 1306 (e.g., Bluetooth®, Zigbee®, RF radio) and antennas 1312 for sending and receiving wireless signals as described herein. The transceivers 1306, 1330 and antennas 1312 may be used with the above-mentioned circuitry to implement the various wireless transmission protocol stacks/interfaces. The wireless ranging device 102 may include a speaker 1308 coupled to the processor 1302 and configured to generate an audio output. The wireless ranging device 102 may also include a microphone 1316 coupled to the processor 1302 to receive an audio input. The wireless ranging device 102 may also include a magnetometer 1318 and an accelerometer/gravitometer/gyroscope 1320 coupled to the processor 1302 to determine directional orientations.

The processors 902, 1002, 1101, 1111, 1121, 1131, 1202, and 1302 may be any programmable microprocessor, microcomputer or multiple processor chip or chips that can be configured by software instructions (applications) to perform a variety of functions, including the functions of the various embodiments described above. In some wireless sensor devices, multiple processors may be provided, such as one processor dedicated to wireless communication functions and one processor dedicated to running other applications. Typically, software applications may be stored in the internal memory 904, 1004, 1102, 1204, and 1304 before they are accessed and loaded into the processors 902, 1002, 1101, 1111, 1121, 1131, 1202, and 1302. The processors 902, 1002, 1101, 1111, 1121, 1131, 1202, and 1302 may include internal memory sufficient to store the application software instructions. In many devices the internal memory may be a volatile or nonvolatile memory, such as flash memory, or a mixture of both. For the purpose of this description, a general reference to memory refers to memory accessible by the processors 902, 1002, 1101, 1111, 1121, 1131, 1202, and 1302 including internal memory or removable memory plugged into the wireless sensor device and memory within the processors 902, 1002, 1101, 1111, 1121, 1131, 1202, and 1302.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for detecting user hand movements and interpreting such movements as a computer input, comprising:
positioning a wireless sensor device near a user's hand;
positioning a first and a second wireless ranging device on the user's body a fixed distance apart such that the two wireless ranging devices form an axis relative to a portion of the user's body;
conducting calibration operations that record distances and one or more calculated angles in memory while a user performs prescribed physical movements;
determining a distance between the wireless sensor device and each wireless ranging device through wireless signal ranging techniques;
calculating an angle between the wireless sensor device and the wireless ranging devices based on the determined distances;
determining an estimated position of the wireless sensor device relative to the wireless ranging devices based on the determined distances and calculated angle;
collecting a sequence of determined estimated positions of the wireless sensor device over a period of time;
comparing the collected sequence of determined estimated positions of the wireless sensor device over a period of time to a database of gesture movement patterns to determine if there is a match within a predefined tolerance;
correlating a computer input command to a recognized gesture; and
executing the correlated computer input command in a computing device.

2. The method of claim 1, further comprising:
receiving motion sensor data from the wireless sensor device; and
using the received motion sensor data when comparing the collected sequence of determined estimated positions of the wireless sensor device over a period of time to a database of gesture movement patterns to determine if there is a match within a predefined tolerance.

3. The method of claim 1, further comprising:
determining directional information from one or more of a magnetometer, an accelerometer and a gyroscope contained within at least one of the wireless ranging devices; and
using the determined directional information when comparing the collected sequence of determined estimated positions of the wireless sensor device over a period of time to a database of gesture movement patterns to determine if there is a match within a predefined tolerance.

4. The method of claim 1, wherein calculating an angle between the wireless sensor device and the wireless ranging devices based on the determined distances, determining an estimated position of the wireless sensor device relative to the wireless ranging devices based on the determined distances and calculated angle, collecting a sequence of determined estimated positions of the wireless sensor device over a period of time, comparing the collected sequence of determined estimated positions of the wireless sensor device over a period of time to a database of gesture movement patterns to determine if there is a match within a predefined tolerance, and correlating a computer input command to a recognized gesture is accomplished in a computing device selected from one of the wireless sensor device, either wireless ranging device, a wireless mobile device carried by a user, and a separate computing device.

5. The method of claim 1, further comprising positioning a second wireless sensor device near the user's other hand, wherein:
collecting a sequence of determined estimated positions of the wireless sensor device over a period of time comprises collecting a sequence of determined estimated positions of both wireless sensor devices over a period of time; and
comparing the collected sequence of determined estimated positions of the wireless sensor device over a period of time to a database of gesture movement patterns to determine if there is a match within a predefined tolerance comprises comparing the collected sequence of determined estimated positions of both wireless sensor devices over a period of time to the database of gesture movement patterns to determine if there is a match within a predefined tolerance.

6. The method of claim 1, further comprising:
positioning a third wireless ranging device on a user such that it is displaced from the axis between the first and second wireless ranging devices; and
determining a distance between the wireless sensor device and the third wireless ranging device through wireless signal ranging techniques,
wherein comparing the collected sequence of determined estimated positions of the wireless sensor device over a period of time to a database of gesture movement patterns to determine if there is a match within a predefined tolerance comprises comparing the collected sequence of determined estimated positions of the wireless sensor device and the determined distance between the wireless sensor device and the third wireless ranging device over a period of time to the database of gesture movement patterns to determine if there is a match within a predefined tolerance.

7. The method of claim 1, wherein the wireless ranging devices are located on one of a headset, a pair of glasses, a helmet, a hard hat, a belt, and a pair of earpiece devices.

8. A method for detecting user hand movements and interpreting such movements as a computer input, comprising:
positioning a wireless sensor device near a user's hand;
positioning a first and a second wireless ranging device on the user's body a fixed distance apart such that the two wireless ranging devices form an axis relative to a portion of the user's body;
determining a distance between the wireless sensor device and each wireless ranging device through wireless signal ranging techniques;
calculating an angle between the wireless sensor device and the wireless ranging devices based on the determined distances;
determining an estimated position of the wireless sensor device relative to the wireless ranging devices based on the determined distances and calculated angle;
collecting a sequence of determined estimated positions of the wireless sensor device over a period of time;
comparing the collected sequence of determined estimated positions of the wireless sensor device over a period of time to a database of gesture movement patterns to determine if there is a match within a predefined tolerance;
correlating a computer input command to a recognized gesture; and
executing the correlated computer input command in a computing device;
wherein determining a distance between the wireless sensor device and each wireless ranging device through wireless signal ranging techniques comprises measuring the distances using wireless ranging transmissions between Peanut® transceivers.

9. A method for detecting user hand movements and interpreting such movements as a computer input, comprising:
positioning a wireless sensor device near a user's hand;
positioning a first and a second wireless ranging device on the user's body a fixed distance apart such that the two wireless ranging devices form an axis relative to a portion of the user's body;
determining a distance between the wireless sensor device and each wireless ranging device through wireless signal ranging techniques;
calculating an angle between the wireless sensor device and the wireless ranging devices based on the determined distances;
determining an estimated position of the wireless sensor device relative to the wireless ranging devices based on the determined distances and calculated angle;
collecting a sequence of determined estimated positions of the wireless sensor device over a period of time;
comparing the collected sequence of determined estimated positions of the wireless sensor device over a period of time to a database of gesture movement patterns to determine if there is a match within a predefined tolerance;
correlating a computer input command to a recognized gesture;
executing the correlated computer input command in a computing device;
receiving motion sensor data from the wireless sensor device;
using the received motion sensor data when comparing the collected sequence of determined estimated positions of the wireless sensor device over a period of time to a database of gesture movement patterns to determine if there is a match within a predefined tolerance;
estimating bounding areas of the user's anatomical range of motion; and
calculating skeletal orientations using inverse kinematic analysis based on the estimated bounding areas, the received motion sensor data, and the determined estimated position of the wireless sensor device.

10. A computing device, comprising:
a memory;
a transceiver; and
a processor coupled to the memory and the transceiver, and configured with processor-executable instructions to perform operations comprising:
recording distances and one or more calculated angles in memory while a user performs prescribed physical movements during calibration operations;
determining a distance between a wireless sensor device and each of a first and a second wireless ranging device using data derived from wireless signal ranging techniques, wherein the first and second wireless ranging devices are worn on a user's body a fixed distance apart such that the two wireless ranging devices form an axis relative to a portion of the user's body;
calculating an angle between the wireless sensor device and the wireless ranging devices based on the determined distances;
determining an estimated position of the wireless sensor device relative to the wireless ranging devices based on the determined distances and calculated angle;
collecting a sequence of determined estimated positions of the wireless sensor device over a period of time;
comparing the collected sequence of determined estimated positions of the wireless sensor device over a period of time to a database of gesture movement patterns to determine if there is a match within a predefined tolerance;
correlating a computer input command to a recognized gesture; and
executing the correlated computer input command.

11. The computing device of claim 10, wherein the processor is configured with processor-executable instructions to perform operations further comprising:
receiving motion sensor data from the wireless sensor device; and
using the received motion sensor data when comparing the collected sequence of determined estimated positions of the wireless sensor device over a period of time to a database of gesture movement patterns to determine if there is a match within a predefined tolerance.

12. The computing device of claim 10, wherein the processor is configured with processor-executable instructions to perform operations further comprising:
determining directional information using data from one of a magnetometer, an accelerometer or a gyroscope contained within at least one of the wireless ranging devices; and
using the determined directional information when comparing the collected sequence of determined estimated positions of the wireless sensor device over a period of time to a database of gesture movement patterns to determine if there is a match within a predefined tolerance.

13. The computing device of claim 10, wherein the computing device is one of the wireless sensor device, either wireless ranging device, a wireless mobile device carried by a user, and a separate computing device.

14. The computing device of claim 10, wherein the processor is configured with processor-executable instructions such that collecting a sequence of determined estimated positions of the wireless sensor device over a period of time comprises collecting a sequence of determined estimated positions of two wireless sensor devices over a period of time; and
comparing the collected sequence of determined estimated positions of the wireless sensor device over a period of time to a database of gesture movement patterns to determine if there is a match within a predefined tolerance comprises comparing the collected sequence of determined estimated positions of both wireless sensor devices over a period of time to the database of gesture movement patterns to determine if there is a match within a predefined tolerance.

15. The computing device of claim 10, wherein the processor is configured with processor-executable instructions to perform operations further comprising:
determining a distance between the wireless sensor device and a third wireless ranging device through wireless signal ranging techniques, wherein the third wireless ranging device is configured to be worn by a user in a position displaced from the axis between the first and second wireless ranging devices; and
wherein the processor is configured with processor-executable instructions such that comparing the collected sequence of determined estimated positions of the wireless sensor device over a period of time to a database of gesture movement patterns to determine if there is a match within a predefined tolerance comprises comparing the collected sequence of determined estimated positions of the wireless sensor device and the determined distance between the wireless sensor device and the third wireless ranging device over a period of time to the database of gesture movement patterns to determine if there is a match within a predefined tolerance.

16. A computing device, comprising:
a memory;
a transceiver; and
a processor coupled to the memory and the transceiver, and configured with processor-executable instructions to perform operations comprising:
   determining a distance between a wireless sensor device and each of a first and a second wireless ranging device using data derived from wireless signal ranging techniques, wherein the first and second wireless ranging devices are worn on a user's body a fixed distance apart such that the two wireless ranging devices form an axis relative to a portion of the user's body;
   calculating an angle between the wireless sensor device and the wireless ranging devices based on the determined distances;
   determining an estimated position of the wireless sensor device relative to the wireless ranging devices based on the determined distances and calculated angle;
   collecting a sequence of determined estimated positions of the wireless sensor device over a period of time;
   comparing the collected sequence of determined estimated positions of the wireless sensor device over a period of time to a database of gesture movement patterns to determine if there is a match within a predefined tolerance;
   correlating a computer input command to a recognized gesture; and
   executing the correlated computer input command;
   wherein the processor is configured with processor-executable instructions such that determining a distance between a wireless sensor device and each of a first and a second wireless ranging device comprises:
      measuring the distances using data obtained from wireless ranging transmissions between Peanut® transceivers.

17. A computing device, comprising:
a memory;
a transceiver; and
a processor coupled to the memory and the transceiver, and configured with processor-executable instructions to perform operations comprising:
   determining a distance between a wireless sensor device and each of a first and a second wireless ranging device using data derived from wireless signal ranging techniques, wherein the first and second wireless ranging devices are worn on a user's body a fixed distance apart such that the two wireless ranging devices form an axis relative to a portion of the user's body;
   calculating an angle between the wireless sensor device and the wireless ranging devices based on the determined distances;
   determining an estimated position of the wireless sensor device relative to the wireless ranging devices based on the determined distances and calculated angle;
   collecting a sequence of determined estimated positions of the wireless sensor device over a period of time;
   comparing the collected sequence of determined estimated positions of the wireless sensor device over a period of time to a database of gesture movement patterns to determine if there is a match within a predefined tolerance;
   correlating a computer input command to a recognized gesture;
   executing the correlated computer input command;
   receiving motion sensor data from the wireless sensor device;
   using the received motion sensor data when comparing the collected sequence of determined estimated positions of the wireless sensor device over a period of time to a database of gesture movement patterns to determine if there is a match within a predefined tolerance;
   estimating bounding areas of the user's anatomical range of motion; and
   calculating skeletal orientations using inverse kinematic analysis based on the estimated bounding areas, the received motion sensor data, and the determined estimated position of the wireless sensor device.

18. A computing device, comprising:
means for recording distances and one or more calculated angles in memory while a user performs prescribed physical movements during calibration operations;
means for determining a distance between a wireless sensor device and each of a first and a second wireless ranging device using data derived from wireless signal ranging techniques when the first and second wireless ranging devices are positioned a user's body a fixed distance apart such that the two wireless ranging devices form an axis relative to a portion of the user's body;
means for calculating an angle between the wireless sensor device and the wireless ranging devices based on the determined distances;
means for determining an estimated position of the wireless sensor device relative to the wireless ranging devices based on the determined distances and calculated angle;
means for collecting a sequence of determined estimated positions of the wireless sensor device over a period of time;
means for comparing the collected sequence of determined estimated positions of the wireless sensor device over a period of time to a database of gesture movement patterns to determine if there is a match within a predefined tolerance;
means for correlating a computer input command to a recognized gesture; and
means for executing the correlated computer input command.

19. The computing device of claim 18, further comprising:
means for receiving motion sensor data from the wireless sensor device; and
means for using the received motion sensor data when comparing the collected sequence of determined estimated positions of the wireless sensor device over a period of time to a database of gesture movement patterns to determine if there is a match within a predefined tolerance.

20. The computing device of claim 18, further comprising:
means for determining directional information using data from one of a magnetometer, an accelerometer or a gyroscope contained within at least one of the wireless ranging devices; and
means for using the determined directional information when comparing the collected sequence of determined estimated positions of the wireless sensor device over a period of time to a database of gesture movement patterns to determine if there is a match within a predefined tolerance.

21. The computing device of claim 18, wherein the computing device is one of the wireless sensor device, either wireless ranging device, a wireless mobile device carried by a user, and a separate computing device.

22. The computing device of claim 18, wherein:
means for collecting a sequence of determined estimated positions of the wireless sensor device over a period of time comprises means for collecting a sequence of determined estimated positions of two wireless sensor devices over a period of time; and
means for comparing the collected sequence of determined estimated positions of the wireless sensor device over a period of time to a database of gesture movement patterns to determine if there is a match within a predefined tolerance comprises means for comparing the collected sequence of determined estimated positions of both wireless sensor devices over a period of time to the database of gesture movement patterns to determine if there is a match within a predefined tolerance.

23. The computing device of claim 18, further comprising:
means for determining a distance between the wireless sensor device and a third wireless ranging device that is perpendicularly displaced from the axis between the first and second wireless ranging devices through wireless signal ranging techniques,
wherein means for comparing the collected sequence of determined estimated positions of the wireless sensor device over a period of time to a database of gesture movement patterns to determine if there is a match within a predefined tolerance comprises means for comparing the collected sequence of determined estimated positions of the wireless sensor device and the determined distance between the wireless sensor device and the third wireless ranging device over a period of time to the database of gesture movement patterns to determine if there is a match within a predefined tolerance.

24. A computing device, comprising:
means for determining a distance between a wireless sensor device and each of a first and a second wireless ranging device using data derived from wireless signal ranging techniques when the first and second wireless ranging devices are positioned a user's body a fixed distance apart such that the two wireless ranging devices form an axis relative to a portion of the user's body;
means for calculating an angle between the wireless sensor device and the wireless ranging devices based on the determined distances;
means for determining an estimated position of the wireless sensor device relative to the wireless ranging devices based on the determined distances and calculated angle;
means for collecting a sequence of determined estimated positions of the wireless sensor device over a period of time;
means for comparing the collected sequence of determined estimated positions of the wireless sensor device over a period of time to a database of gesture movement patterns to determine if there is a match within a predefined tolerance;
means for correlating a computer input command to a recognized gesture; and
means for executing the correlated computer input command;
wherein means for determining a distance between a wireless sensor device and each of a first and a second wireless ranging device using data derived from wireless signal ranging techniques comprises:
means for measuring the distances using data obtained from wireless ranging transmissions between Peanut® transceivers.

25. A computing device, comprising:
means for determining a distance between a wireless sensor device and each of a first and a second wireless ranging device using data derived from wireless signal ranging techniques when the first and second wireless ranging devices are positioned a user's body a fixed distance apart such that the two wireless ranging devices form an axis relative to a portion of the user's body;
means for calculating an angle between the wireless sensor device and the wireless ranging devices based on the determined distances;
means for determining an estimated position of the wireless sensor device relative to the wireless ranging devices based on the determined distances and calculated angle;
means for collecting a sequence of determined estimated positions of the wireless sensor device over a period of time;
means for comparing the collected sequence of determined estimated positions of the wireless sensor device over a period of time to a database of gesture movement patterns to determine if there is a match within a predefined tolerance;
means for correlating a computer input command to a recognized gesture;
means for executing the correlated computer input command;
means for receiving motion sensor data from the wireless sensor device;
means for using the received motion sensor data when comparing the collected sequence of determined estimated positions of the wireless sensor device over a period of time to a database of gesture movement patterns to determine if there is a match within a predefined tolerance;
means for estimating bounding areas of the user's anatomical range of motion; and
means for calculating skeletal orientations using inverse kinematic analysis based on the estimated bounding areas, the received motion sensor data, and the determined estimated position of the wireless sensor device.

26. A non-transitory processor-readable storage medium having stored thereon processor-executable software instructions configured to cause a processor to perform operations for detecting user hand movements and interpreting such movements as a computer input, the operations comprising:
recording distances and one or more calculated angles in memory while the user performs prescribed physical movements during calibration operations;
determining a distance between a wireless sensor device and each of a first and a second wireless ranging device using data derived from wireless signal ranging techniques when the first and second wireless ranging devices are positioned on a user's body a fixed distance apart such that the two wireless ranging devices form an axis relative to a portion of the user's body;
calculating an angle between the wireless sensor device and the wireless ranging devices based on the determined distances;
determining an estimated position of the wireless sensor device relative to the wireless ranging devices based on the determined distances and calculated angle;
collecting a sequence of determined estimated positions of the wireless sensor device over a period of time;

comparing the collected sequence of determined estimated positions of the wireless sensor device over a period of time to a database of gesture movement patterns to determine if there is a match within a predefined tolerance;

correlating a computer input command to a recognized gesture; and executing the correlated computer input command.

27. The non-transitory processor-readable storage medium of claim 26, wherein the stored processor-executable software instructions are configured to cause a processor to perform operations further comprising:

receiving motion sensor data from the wireless sensor device; and using the received motion sensor data when comparing the collected sequence of determined estimated positions of the wireless sensor device over a period of time to a database of gesture movement patterns to determine if there is a match within a predefined tolerance.

28. The non-transitory processor-readable storage medium of claim 26, wherein the stored processor-executable software instructions are configured to cause a processor to perform operations further comprising:

determining directional information using data from one of a magnetometer, an accelerometer or a gyroscope contained within at least one of the wireless ranging devices; and using the determined directional information when comparing the collected sequence of determined estimated positions of the wireless sensor device over a period of time to a database of gesture movement patterns to determine if there is a match within a predefined tolerance.

29. The non-transitory processor-readable storage medium of claim 26, wherein the stored processor-executable software instructions are configured to cause a processor to perform operations such that:

collecting a sequence of determined estimated positions of the wireless sensor device over a period of time comprises collecting a sequence of determined estimated positions of two wireless sensor devices over a period of time; and comparing the collected sequence of determined estimated positions of the wireless sensor device over a period of time to a database of gesture movement patterns to determine if there is a match within a predefined tolerance comprises comparing the collected sequence of determined estimated positions of both wireless sensor devices over a period of time to the database of gesture movement patterns to determine if there is a match within a predefined tolerance.

30. The non-transitory processor-readable storage medium of claim 26, wherein the stored processor-executable software instructions are configured to cause a processor to perform operations further comprising:

determining a distance between the wireless sensor device and a third wireless ranging device that is perpendicularly displaced from the axis between the first and second wireless ranging devices through wireless signal ranging techniques, wherein the stored processor-executable software instructions are configured to cause a processor to perform operations such that comparing the collected sequence of determined estimated positions of the wireless sensor device over a period of time to a database of gesture movement patterns to determine if there is a match within a predefined tolerance comprises comparing the collected sequence of determined estimated positions of the wireless sensor device and the determined distance between the wireless sensor device and the third wireless ranging device over a period of time to the database of gesture movement patterns to determine if there is a match within a predefined tolerance.

31. A non-transitory processor-readable storage medium having stored thereon processor-executable software instructions configured to cause a processor to perform operations for detecting user hand movements and interpreting such movements as a computer input, the operations comprising:

determining a distance between a wireless sensor device and each of a first and a second wireless ranging device using data derived from wireless signal ranging techniques when the first and second wireless ranging devices are positioned on a user's body a fixed distance apart such that the two wireless ranging devices form an axis relative to a portion of the user's body;

calculating an angle between the wireless sensor device and the wireless ranging devices based on the determined distances;

determining an estimated position of the wireless sensor device relative to the wireless ranging devices based on the determined distances and calculated angle;

collecting a sequence of determined estimated positions of the wireless sensor device over a period of time;

comparing the collected sequence of determined estimated positions of the wireless sensor device over a period of time to a database of gesture movement patterns to determine if there is a match within a predefined tolerance;

correlating a computer input command to a recognized gesture; and executing the correlated computer input command;

wherein the stored processor-executable software instructions are configured to cause a processor to perform operations such that determining a distance between a wireless sensor device and each of a first and a second wireless ranging device using data derived from wireless signal ranging techniques comprises:

measuring the distances using data obtained from wireless ranging transmissions between Peanut® transceivers.

32. A non-transitory processor-readable storage medium having stored thereon processor-executable software instructions configured to cause a processor to perform operations for detecting user hand movements and interpreting such movements as a computer input, the operations comprising:

determining a distance between a wireless sensor device and each of a first and a second wireless ranging device using data derived from wireless signal ranging techniques when the first and second wireless ranging devices are positioned on a user's body a fixed distance apart such that the two wireless ranging devices form an axis relative to a portion of the user's body;

calculating an angle between the wireless sensor device and the wireless ranging devices based on the determined distances;

determining an estimated position of the wireless sensor device relative to the wireless ranging devices based on the determined distances and calculated angle;

collecting a sequence of determined estimated positions of the wireless sensor device over a period of time;

comparing the collected sequence of determined estimated positions of the wireless sensor device over a period of time to a database of gesture movement patterns to determine if there is a match within a predefined tolerance;

correlating a computer input command to a recognized gesture;

executing the correlated computer input command;

receiving motion sensor data from the wireless sensor device;

using the received motion sensor data when comparing the collected sequence of determined estimated positions of the wireless sensor device over a period of time to a database of gesture movement patterns to determine if there is a match within a predefined tolerance;

estimating bounding areas of the user's anatomical range of motion; and calculating skeletal orientations using inverse kinematic analysis based on the estimated bounding areas, the received motion sensor data, and the determined estimated position of the wireless sensor device.

33. A system, comprising:
a computing device;
a wireless sensor device;
a first wireless ranging device; and
a second wireless ranging device,
wherein the computing device comprises:
   a memory;
   a transceiver configured to communicate with at least on of the wireless sensor device and the first and second wireless ranging devices; and
   a processor coupled to the memory and the transceiver, and configured with processor-executable instructions to perform operations comprising:
      recording determined distances and one or more calculated angles in memory while the user performs prescribed physical movements during calibration operations;
      receiving distance information via short-range radio signals from the first and second wireless ranging devices;
      calculating an angle between the wireless sensor device and the wireless ranging devices based on distance information;
      determining an estimated position of the wireless sensor device relative to the wireless ranging devices based on the received distance information and calculated angle;
      collecting a sequence of determined estimated positions of the wireless sensor device over a period of time;
      comparing the collected sequence of determined estimated positions of the wireless sensor device over a period of time to a database of gesture movement patterns to determine if there is a match within a predefined tolerance;
      correlating a computer input command to a recognized gesture; and
      executing the correlated computer input command,
   wherein the wireless sensor device comprises:
      a transceiver configured to communicate with the first and second wireless ranging devices using short-range radio signals; and
      a processor coupled to the transceiver and configured with processor-executable instructions to perform operations comprising:
         exchanging short-range radio signals between each of the first and second wireless ranging devices to enable determining separation distances using wireless signal ranging techniques, wherein the wireless sensor device is configured to be worn by a user, wherein the first and second wireless ranging devices each comprise: a transceiver configured to communicate with the wireless sensor device using short-range radio signals; and
      a processor coupled to the transceiver and configured with processor-executable instructions to perform operations comprising:
         determining to the wireless sensor device using wireless signal ranging techniques; and
         sending the distance information via short-range radio signals to the computing device, and
      wherein the first and second wireless ranging devices are configured to be worn by the user a fixed distance apart such that the two wireless ranging devices form an axis relative to a portion of the user's body.

34. The system of claim 33,
wherein the wireless sensor device further comprises one or more motion sensors selected from accelerometers, gyroscopes, magnetometer, and a compass,
wherein the wireless sensor device processor is configured with processor-executable instructions to perform operations further comprising transmitting motion sensor data to the computing device, and
wherein the computing device is configured with processor-executable instructions to perform operations further comprising:
   receiving motion sensor data from the wireless sensor device; and
   using the received motion sensor data when comparing the collected sequence of determined estimated positions of the wireless sensor device over a period of time to a database of gesture movement patterns to determine if there is a match within a predefined tolerance.

35. The system of claim 34, wherein the computing device is configured with processor-executable instructions to perform operations further comprising:
   estimating bounding areas of the user's anatomical range of motion; and
   calculating skeletal orientations using inverse kinematic analysis based on the estimated bounding areas, the received motion sensor data, and the determined estimated position of the wireless sensor device.

36. The system of claim 33, wherein:
the wireless sensor device transceiver is a Peanut® transceiver;
the first and second wireless ranging device are Peanut® transceivers; and
the first and second wireless ranging device processors are configured with processor- executable instructions to perform operations such that determining a distance between the wireless sensor device and the first wireless ranging device based on wireless signal ranging techniques comprises measuring the distance to the wireless sensor device using data obtained from wireless ranging transmissions between the Peanut® transceivers.

37. The system of claim 33,
wherein the wireless sensor device further comprises one or more motion sensors selected from accelerometers, gyroscopes, and a magnetometer,
wherein the wireless sensor device processor is configured with processor-executable instructions to perform operations further comprising transmitting motion sensor data to the computing device, and wherein the computing device is configured with processor-executable instructions to perform operations further comprising:
    determining directional information from received sensor data; and using the determined directional information when comparing the
    collected sequence of determined estimated positions of the wireless sensor device over a period of time to a database of gesture movement patterns to determine if there is a match within a predefined tolerance.

38. The system of claim 33, wherein the computing device is one of the wireless sensor device, the first wireless ranging device, the second wireless ranging device, a wireless mobile device carried by the user, and a separate computing device.

39. The system of claim 33, further comprising:
a second wireless sensor device, comprising:
    a transceiver configured to communicate using short-range radio signals; and
    a processor coupled to the transceiver and configured with processor-executable instructions to perform operations comprising:
        exchanging short-range radio signals between the first wireless ranging device and the second wireless sensor device; and
        exchanging short-range radio signals between the second wireless ranging device and the second wireless sensor device,
    wherein the computing device is configured with processor-executable instructions to perform operations such that:
    collecting a sequence of determined estimated positions of the wireless sensor device over a period of time comprises collecting a sequence of determined estimated positions of both wireless sensor devices over a period of time; and
    comparing the collected sequence of determined estimated positions of the wireless sensor device over a period of time to a database of gesture movement patterns to determine if there is a match within a predefined tolerance comprises comparing the collected sequence of determined estimated positions of both wireless sensor devices over a period of time to the database of gesture movement patterns to determine if there is a match within a predefined tolerance.

40. The system of claim 33, further comprising:
a third wireless ranging device, comprising:
    a transceiver configured to communicate using short-range radio signals; and
    a processor coupled to transceiver and configured with processor-executable instructions to perform operations comprising:
        exchanging short-range radio signals between the third wireless ranging device and the wireless sensor device;
        determining a distance between the wireless sensor device and the third wireless ranging device based on wireless signal ranging techniques; and
        transmitting the distance information to the computing device,
    wherein the third wireless ranging device is configured to be worn by a user in a position displaced from the axis between the first and second wireless ranging devices,
    wherein the wireless sensor device is configured with processor-executable instructions to perform operations further comprising exchanging short-range radio signals between the third wireless ranging device and the wireless sensor device, and wherein the computing device is configured with processor-executable instructions to perform operations such that comparing the collected sequence of determined estimated positions of the wireless sensor device over a period of time to a database of gesture movement patterns to determine if there is a match within a predefined tolerance comprises comparing the collected sequence of determined estimated positions of the wireless sensor device and the determined distance between the wireless sensor device and the third wireless ranging device over a period of time to the database of gesture movement patterns to determine if there is a match within a predefined tolerance.

41. The system of claim 33, wherein the first and second wireless ranging devices are positioned on one of a headset, a pair of glasses, a helmet, a hard hat, a belt, and earpiece devices.

* * * * *